United States Patent
Tsunashima et al.

(10) Patent No.: US 9,840,058 B2
(45) Date of Patent: **\*Dec. 12, 2017**

(54) FIBER-REINFORCED EPOXY RESIN MATERIAL, PREPREG AND, TUBULAR BODY MADE OF FIBER-REINFORCED EPOXY RESIN MATERIAL

(71) Applicant: DUNLOP SPORTS CO., LTD., Kobe-shi, Hyogo (JP)

(72) Inventors: Hiromasa Tsunashima, Kobe (JP); Yasuo Naito, Kobe (JP); Kazuyoshi Shiga, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/439,582

(22) PCT Filed: Oct. 31, 2013

(86) PCT No.: PCT/JP2013/079569
§ 371 (c)(1),
(2) Date: Apr. 29, 2015

(87) PCT Pub. No.: WO2014/069576
PCT Pub. Date: May 8, 2014

(65) Prior Publication Data
US 2015/0290900 A1   Oct. 15, 2015

(30) Foreign Application Priority Data

Oct. 31, 2012   (JP) ................................. 2012-241115
Oct. 31, 2012   (JP) ................................. 2012-241116
(Continued)

(51) Int. Cl.
*A63B 53/10*   (2015.01)
*B32B 1/08*   (2006.01)
(Continued)

(52) U.S. Cl.
CPC ................ *B32B 1/08* (2013.01); *A63B 49/10* (2013.01); *A63B 53/10* (2013.01); *B32B 5/26* (2013.01);
(Continued)

(58) Field of Classification Search
CPC ................ B32B 5/26; B32B 2260/023; B32B 2260/046; B32B 2262/106;
(Continued)

(56) References Cited

U.S. PATENT DOCUMENTS 6,106,413 A * 8/2000 Kusumoto ............. A63B 53/10
  473/319
6,767,422 B1 * 7/2004 Atsumi .................. A63B 53/10
  156/184

(Continued)

FOREIGN PATENT DOCUMENTS

JP   08-337707 A      12/1996
JP   09-071633    *    3/1997
(Continued)

OTHER PUBLICATIONS

International Search Report issued in PCT/JP2013/079569 dated Feb. 4, 2014.
(Continued)

*Primary Examiner* — Stephen Blau
(74) *Attorney, Agent, or Firm* — Birch, Stewart, Kolasch & Birch, LLP

(57) ABSTRACT

An object of the present invention is to provide a novel fiber-reinforced epoxy resin material having improved strength. The fiber-reinforced epoxy resin material of the present invention comprises a cured product of an epoxy resin composition and a reinforcing fiber, wherein the epoxy resin composition comprises a novolac type epoxy resin as an epoxy resin component, and the cured product of the
(Continued)

epoxy resin composition has a swelling ratio in a range from 20 mass % to 44 mass % in methyl ethyl ketone.

19 Claims, 3 Drawing Sheets

(30) Foreign Application Priority Data

Oct. 21, 2013 (JP) .................................. 2013-218467
Oct. 21, 2013 (JP) .................................. 2013-218468

(51) Int. Cl.
*C08J 5/24* (2006.01)
*B32B 5/26* (2006.01)
*A63B 49/10* (2015.01)

(52) U.S. Cl.
CPC ............. *C08J 5/24* (2013.01); *A63B 2209/02* (2013.01); *B32B 2260/023* (2013.01); *B32B 2260/046* (2013.01); *B32B 2262/106* (2013.01); *B32B 2307/51* (2013.01); *B32B 2307/54* (2013.01); *B32B 2597/00* (2013.01); *C08J 2363/02* (2013.01); *C08J 2429/14* (2013.01); *C08J 2463/02* (2013.01); *C08J 2463/04* (2013.01)

(58) Field of Classification Search
CPC ... B32B 2597/00; B32B 1/08; B32B 2307/51; B32B 2307/54; A63B 53/10; A63B 2053/002; A63B 49/10; A63B 2209/02; C08J 2363/02; C08J 2463/04; C08J 5/24; C08J 2429/14; C08J 2463/02
See application file for complete search history.

(56) References Cited

U.S. PATENT DOCUMENTS

| | | | |
|---|---|---|---|
| 7,645,514 B2 * | 1/2010 | Watanabe | ............. C09J 7/0203 |
| | | | 156/330 |
| 8,084,564 B2 * | 12/2011 | Kano | ...................... C23C 18/31 |
| | | | 428/500 |
| 8,137,786 B2 * | 3/2012 | Kousaka | .................. B32B 3/12 |
| | | | 428/117 |
| 2013/0172098 A1 | 7/2013 | Shiga et al. | |

FOREIGN PATENT DOCUMENTS

| | | | |
|---|---|---|---|
| JP | 09-71633 A | | 3/1997 |
| JP | 09-085844 | * | 3/1997 |
| JP | 09-85844 A | | 3/1997 |
| JP | 2000-336189 A | | 12/2000 |
| JP | 2001-054602 A | | 2/2001 |
| JP | 2003-041093 A | | 2/2003 |
| JP | 2003-103519 A | | 4/2003 |
| JP | 2013-139511 A | | 7/2013 |

OTHER PUBLICATIONS

English Translation of the Japanese Notice of Reasons for Rejection, dated Apr. 4, 2017, for Japanese Application No. 2013-218467.

English Translation of the Japanese Notice of Reasons for Rejection, dated Apr. 4, 2017, for Japanese Application No. 2013-218468.

* cited by examiner

FIBER-REINFORCED EPOXY RESIN MATERIAL, PREPREG AND, TUBULAR BODY MADE OF FIBER-REINFORCED EPOXY RESIN MATERIAL

FIELD OF THE INVENTION

The present invention relates to a fiber-reinforced epoxy resin material, a prepreg used for preparing the fiber-reinforced epoxy resin material, and a tubular body made of the fiber-reinforced epoxy resin material.

DESCRIPTION OF THE RELATED ART

A tubular body made of a fiber-reinforced epoxy resin material is used for a golf club shaft or a fishing rod. For example, Patent literature 1 discloses a tubular body including a fiber-reinforced composite material layer that is obtained by heating and curing a prepreg sheet comprising a reinforcing fiber oriented in one direction and an epoxy resin composition, wherein a tensile modulus E (GPa) of the reinforcing fiber and a six-degree compressive strength σ (MPa) of the fiber-reinforced composite material obtained by heating and curing meet the following formulae (1) and (2).

$$200\ GPa \leq E \leq 950\ GPa \tag{1}$$

$$-3.6E + 2000 \leq \sigma \leq -3.6E + 2600 \tag{2}$$

Patent literature 2 discloses a golf club shaft that is formed by using a fiber-reinforced composite material comprising, as a component, a reinforcing fiber having a tensile modulus of 200 to 800 GPa and an epoxy resin composition that comprises a curing agent and a following component [A] and/or component [B], wherein a tensile modulus of a cured product of the epoxy resin composition is from 3.4 to 4.4 GPa, and a cutting amount of the fiber-reinforced composite material that is cut by wet cutting is not greater than 3% by weight.

[A] a compound having one functional group that can react with an epoxy resin or a curing agent, and one or more amide bond within a molecule thereof.

[B] a polyester polyurethane having an aromatic ring within a molecule thereof.

Patent literature 3 discloses a tubular body made of a fiber-reinforced plastic that is composed of a reinforcing fiber and a matrix resin, and the matrix resin is a cured product of an epoxy resin composition composed of the following components [A], [B], and [C].

[A] an epoxy resin comprising a difunctional epoxy resin in an amount of 70 parts or more by weight per 100 parts by weight of the epoxy resin

[B] fine particles that contain a rubber phase and that are substantially insoluble in an epoxy resin

[C] a curing agent

Patent literature 4 discloses: a fiber-reinforced composite material composed of a reinforcing fiber and a cured product of a fiber-reinforced composite material epoxy resin composition comprising at least following components [A], [B], and [C]; and a golf shaft made of the fiber-reinforced composite material.

[A] an epoxy resin comprising a difunctional epoxy resin in an amount of 70 parts or more by weight per 100 parts by weight of the epoxy resin

[B] a polyester or polyamide thermoplastic elastomer

[C] a curing agent or a blend of a curing agent and a curing accelerator

CITATION LIST

Patent Literature

Patent literature 1: Japanese Patent Publication No. 2003-103519 A

Patent literature 2: Japanese Patent Publication No. 2001-54602 A

Patent literature 3: Japanese Patent Publication No. H9-85844 A

Patent literature 4: Japanese Patent Publication No. H8-337707 A

SUMMARY OF THE INVENTION

Technical Problem

With the higher performance and higher quality of a golf club, a fishing rod, and the like, the strength of the above-described tubular body made of the fiber-reinforced composite material has become insufficient. Particularly, in resent years, a low-thickness part is formed on the tubular body in order to control the location of the gravity center, whip extent and the like of the tubular body, thus it is required that the fiber-reinforced composite material has a higher strength. In addition, the prepreg is required to have good tackiness and drapability, however, if the epoxy resin having a low molecular weight is used as the resin component in order to decrease the viscosity of the resin component, the obtained fiber-reinforced composite molded body exhibits decreased strength. The present invention has been made in view of the above-described circumstances, and an object of the present invention is to provide a novel fiber-reinforced epoxy resin material from which a tubular body having excellent strength can be obtained. Further, another object of the present invention is to provide a prepreg which exhibits good tackiness and drapability and from which a tubular body having excellent strength and made of a fiber-reinforced epoxy resin material can be obtained.

Solution to Problem

The present invention provides a fiber-reinforced epoxy resin material comprising a cured product of an epoxy resin composition and a reinforcing fiber, wherein the epoxy resin composition comprises a novolac type epoxy resin as an epoxy resin component, and the cured product of the epoxy resin composition has a swelling ratio in a range from 20 mass % to 44 mass % in methyl ethyl ketone. The swelling ratio in methyl ethyl ketone is an index of the crosslinking density of the epoxy resin composition. The cured product of the epoxy resin composition having a swelling ratio in methyl ethyl ketone within the above range has appropriate elongation and gives excellent adhesion to the reinforcing fiber.

In the fiber-reinforced epoxy resin material of the present invention, it is preferable that the epoxy resin component comprises the novolac type epoxy resin and a phenoxy type epoxy resin. If the novolac type epoxy resin and the phenoxy type epoxy resin are blended as the epoxy resin component, the cured product of the epoxy resin composition exhibits enhanced elongation by the action of the phenoxy type epoxy resin, and exhibits enhanced strength due to the increased crosslinking density by the action of the novolac type epoxy resin. As a result, in the fiber-reinforced epoxy resin material of the present invention, the strength of the interface between the reinforcing fiber and the matrix resin is enhanced and the reinforcement effect with the reinforcing fiber is increased, thus the resultant fiber-reinforced epoxy resin material exhibits further enhanced mechanical strength.

In the fiber-reinforced epoxy resin material of the present invention, it is preferable that, the epoxy resin component comprises the novolac type epoxy resin, a bisphenol A type epoxy resin and a bisphenol F type epoxy resin, a content of the novolac type epoxy resin in the entire epoxy resin component ranges from 2 mass % to 19 mass %, a mass ratio of the bisphenol A type epoxy resin to the bisphenol F type epoxy resin (bisphenol A type epoxy resin/bisphenol F type epoxy resin) in the epoxy resin component ranges from 0.3 to 3.0, and an epoxy equivalent (g/eq) of the entire epoxy resin component ranges from 200 to 400. If the novolac type epoxy resin, the bisphenol A type epoxy resin and the bisphenol F type epoxy resin are comprised as the epoxy resin component, and the contents thereof are controlled, the cured product of the epoxy resin composition exhibits enhanced toughness and strength, while the prepreg exhibits enhanced tackiness and drapability. As a result, in the fiber-reinforced epoxy resin molded body which is obtained from the prepreg of the present invention, the strength of the interface between the reinforcing fiber and the matrix resin is enhanced and the reinforcement effect with the reinforcing fiber is increased, thus the resultant fiber-reinforced epoxy resin molded body exhibits further enhanced mechanical strength.

The present invention further provides a prepreg used for preparing the above-described fiber-reinforced epoxy resin material. In addition, the present invention further provides a tubular body made of the above-described fiber-reinforced epoxy resin material. It is preferable that, the tubular body is obtained by laminating multiple prepregs and curing the resin composition comprised in the prepregs, the outermost prepreg locating on the outermost side is the prepreg of the present invention, and at least one of the prepregs locating on the inner side of the outermost prepreg has a smaller density than the outermost prepreg. Furthermore, the present invention further provides a golf club shaft comprising this tubular body made of the fiber-reinforced epoxy resin material.

Effect of the Invention

Use of the fiber-reinforced epoxy resin material of the present invention provides a tubular body which is excellent in bending strength. In addition, use of the fiber-reinforced epoxy resin material of the present invention provides a tubular body which is excellent in bending strength and has a light weight.

DESCRIPTION OF THE PREFERRED EMBODIMENT

Figure 1:
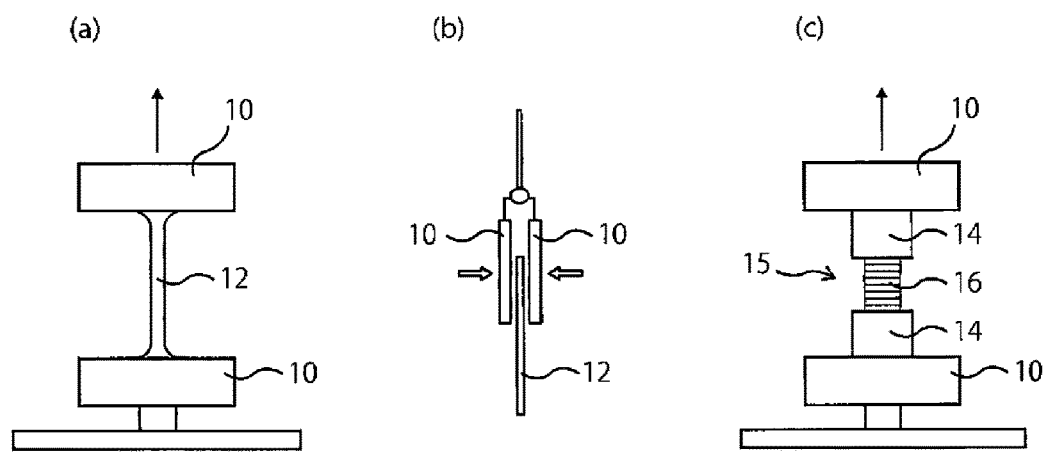
FIG. 1 is an explanatory drawing illustrating an embodiment of a tensile test.

The present invention provides a fiber-reinforced epoxy resin material comprising a cured product of an epoxy resin composition and a reinforcing fiber, wherein the epoxy resin composition comprises a novolac type epoxy resin as an epoxy resin component, and the cured product of the epoxy resin composition has a swelling ratio in a range from 20 mass % to 44 mass % in methyl ethyl ketone.

In the present invention, the swelling ratio of the cured product of the epoxy resin composition in methyl ethyl ketone is preferably 20 mass % or more, more preferably 25 mass % or more, and is preferably 44 mass % or less, more preferably 38 mass % or less. The swelling ratio in methyl ethyl ketone is an index of the crosslinking degree of the cured product of the epoxy resin composition. The cured product of the epoxy resin composition having a swelling ratio in methyl ethyl ketone within the above range has appropriate elongation and gives excellent adhesion to the reinforcing fiber. If the swelling ratio is less than 20 mass %, the crosslinking density becomes excessively high, thus the cured product of the epoxy resin composition exhibits a lowered elongation. On the other hand, if the swelling ratio is more than 44 mass %, the crosslinking density becomes excessively low, thus the cured product of the epoxy resin composition exhibits a lowered strength.

The tensile property (=maximum stress×elongation at maximum stress/2) of the cured product of the epoxy resin composition is preferably 100 MPa·% or more, more preferably 150 MPa·% or more, and even more preferably 200 MPa·% or more, and is preferably 6000 MPa·% or less, more preferably 5500 MPa·% or less, and even more preferably 5000 MPa·% or less.

The tensile strength (maximum stress) of the cured product of the epoxy resin composition is preferably 20 MPa or more, more preferably 30 MPa or more, and even more preferably 50 MPa or more, and is preferably 500 MPa or less, more preferably 450 MPa or less, and even more preferably 400 MPa or less. In addition, the elongation (elongation at break) of the cured product of the epoxy resin composition is preferably 2% or more and more preferably 3% or more, and is preferably 300% or less and more preferably 200% or less. Measurement methods of the tensile strength and the elongation will be described later.

The novolac type epoxy resin is a multifunctional epoxy resin having more than two epoxy groups (preferably three epoxy groups or more) within the molecule. If the novolac type epoxy resin is comprised, the crosslinking density of the cured product of the epoxy resin composition can be controlled. It is thought that the strength of the interface between the reinforcing fiber and the epoxy resin is improved by controlling the crosslinking density and making the elongation of the cured product of the epoxy resin composition fall within an appropriate range. The novolac type epoxy resin is not particularly limited, and examples thereof include a phenolic novolac type epoxy resin and an o-cresol novolac type epoxy resin.

The epoxy equivalent (g/eq) of the novolac type epoxy resin is preferably 50 or more, more preferably 75 or more, and even more preferably 100 or more, and is preferably 500 or less, more preferably 400 or less, and even more preferably 300 or less. If the epoxy equivalent of the novolac type epoxy resin falls within the above range, a crosslinked structure can be effectively formed.

Examples of commercial products of the phenolic novolac type epoxy resins include jER (registered trademark) 152 and jER154 (both of them are manufactured by Mitsubishi Chemical Corporation), EPICLON (registered trademark) N-740, EPICLON N-770 and EPICLON N-775 (all of them are manufactured by DIC Corporation), PY307, EPN1179 and EPN1180 (all of them are manufactured by Huntsman Advanced Materials, Inc.), YDPN638 and YDPN638P (both of them are manufactured by Tohto Kasei Co., Ltd.), DEN431, DEN438 and DEN439 (all of them are manufactured by the Dow Chemical Company), EPR600 (manufactured by Bakelite AG), and EPPN-201 (manufactured by NIPPON KAYAKU Co., Ltd.).

The content of the novolac type epoxy resin in the entire epoxy resin component contained in the epoxy resin composition is preferably 2 mass % or more, more preferably 5 mass % or more, and even more preferably 7 mass % or more, and is preferably 19 mass % or less, more preferably 15 mass % or less, and even more preferably 10 mass % or less. If the content of the novolac type epoxy resin is 2 mass % or more, the crosslinking density is increased, thus the strength of the cured product of the resin composition is further enhanced. In addition, if the content of the novolac type epoxy resin is 19 mass % or less, the elongation of the cured product of the resin composition is maintained, and the strength of the fiber-reinforced epoxy resin material is further enhanced because the strength of the interface between the reinforcing fiber and the epoxy resin becomes high.

The above-described epoxy resin composition preferably further comprises, as the epoxy resin component, an epoxy resin having two epoxy groups within the molecule, namely, a difunctional epoxy resin. Specific examples of the difunctional epoxy resin include bisphenol type epoxy resins such as a bisphenol A type epoxy resin or a hydrogenated product thereof, a bisphenol F type epoxy resin or a hydrogenated product thereof, a bisphenol S type epoxy resin, a tetrabromobisphenol A type epoxy resin, and a bisphenol AD type epoxy resin. The bisphenol type epoxy resins may be used solely, or as a mixture of two or more of them. In addition, the epoxy resin composition may further comprise a phenoxy resin.

The epoxy equivalent (g/eq) of the entire epoxy resin component contained in the epoxy resin composition is preferably 200 or more and more preferably 250 or more, and is preferably 400 or less and more preferably 350 or less. If the epoxy equivalent of the entire epoxy resin component is less than 200, the epoxy resin component is in a liquid state at normal temperature, and it may be difficult to produce or mold a prepreg. On the other hand, if the epoxy equivalent is greater than 400, the epoxy resin component is in a solid state at normal temperature, and molding may become difficult.

In a preferable embodiment (hereinafter also called as "embodiment I"), the epoxy resin composition comprises the novolac type epoxy resin and the phenoxy type epoxy resin as the epoxy resin component, and the cured product thereof has a swelling ratio in a range from 20 mass % to 44 mass % in methyl ethyl ketone. In another preferable embodiment (hereinafter also called as "embodiment II"), the epoxy resin composition comprises the novolac type epoxy resin, the bisphenol A type epoxy resin and the bisphenol F type epoxy resin as the epoxy resin component, the content of the novolac type epoxy resin in the entire epoxy resin component ranges from 2 mass % to 19 mass %, the mass ratio of the bisphenol A type epoxy resin to the bisphenol F type epoxy resin (bisphenol A type epoxy resin/bisphenol F type epoxy resin) in the epoxy resin component ranges from 0.3 to 3.0, the epoxy equivalent (g/eq) of the entire epoxy resin component ranges from 200 to 400, and the cured product of the epoxy resin composition has a swelling ratio in a range from 20 mass % to 44 mass % in methyl ethyl ketone.

Firstly, the epoxy resin component of the epoxy resin composition in the embodiment I will be described. If the novolac type epoxy resin and the phenoxy type epoxy resin are blended as the epoxy resin component in the embodiment I, the cured product of the epoxy resin composition exhibits enhanced elongation by the action of the phenoxy type epoxy resin, and exhibits enhanced strength due to the increased crosslinking density by the action of the novolac type epoxy resin.

A conventionally known phenoxy type epoxy resin can be used as the above-described phenoxy type epoxy resin. Examples of the phenoxy type epoxy resin include a bisphenol A type phenoxy resin, a bisphenol F type phenoxy resin, a copolymerized phenoxy resin obtained from a bisphenol A type phenoxy resin and a bisphenol F type phenoxy resin, a biphenyl type phenoxy resin, a bisphenol S type phenoxy resin, and a copolymerized phenoxy resin obtained from a biphenyl type phenoxy resin and a bisphenol S type phenoxy resin. Among them, the bisphenol A type phenoxy resin, the bisphenol F type phenoxy resin, and the copolymerized phenoxy resin obtained from the bisphenol A type phenoxy resin and the bisphenol F type phenoxy resin are preferable, and the bisphenol A type phenoxy resin is more preferable. The phenoxy type epoxy resins may be used solely, or as a mixture of two or more of them. In addition, the phenoxy type epoxy resin preferably has two epoxy groups within the molecule.

The weight average molecular weight of the phenoxy type epoxy resin is preferably 10000 or more, more preferably 20000 or more, and even more preferably 30000 or more, and is preferably 130000 or less, more preferably 110000 or less, and even more preferably 90000 or less. If the weight average molecular weight is 10000 or more, the cured product of the epoxy resin composition exhibits better elongation, and if the weight average molecular weight is 130000 or less, the cured product of the epoxy resin composition exhibits better strength. The weight average molecular weight may be measured with gel permeation chromatography (GPC) by using polystyrene as a standard substance.

The epoxy equivalent (g/eq) of the phenoxy type epoxy resin is preferably 4000 or more, more preferably 4500 or more, and even more preferably 5000 or more, and is preferably 20000 or less, more preferably 18000 or less, and even more preferably 16000 or less. If the epoxy equivalent of the phenoxy type epoxy resin falls within the above range, a crosslinked structure can be effectively formed.

Examples of commercial products of the phenoxy type epoxy resin include jER (registered trademark) 1256, jER4250, jER4275 and jER1255HX30 (all of them are manufactured by Mitsubishi Chemical Corporation), YP-50 and YP-50S (both of them are manufactured by Nippon Steel & Sumikin Chemical Co., Ltd.), PKHB, PKHC, PKHH and PKHJ (all of them are manufactured by InChem Corporation).

The content of the phenoxy type epoxy resin in the entire epoxy resin component of the embodiment I is preferably 1 mass % or more, more preferably 2 mass % or more, and even more preferably 3 mass % or more, and is preferably 18 mass % or less, more preferably 17 mass % or less, and even more preferably 16 mass % or less. If the content of the phenoxy type epoxy resin is 1 mass % or more, the cured product of the epoxy resin composition exhibits better elongation, and if the content of the phenoxy type epoxy resin is 18 mass % or less, the cured product of the epoxy resin composition exhibits better strength.

The mass ratio of the novolac type epoxy resin to the phenoxy type resin (novolac type epoxy resin/phenoxy type resin) in the epoxy resin component of the embodiment I is preferably 0.4 or more, more preferably 0.7 or more, and even more preferably 1.0 or more, and is preferably 7.0 or less, more preferably 6.5 or less, and even more preferably 6.0 or less. If the mass ratio is 0.4 or more, the crosslinking density is increased, thus the strength is further enhanced. Furthermore, moldability during the production of a prepreg becomes better, and workability is enhanced because occurrence of a void is inhibited. In addition, if the mass ratio is 7.0 or less, the crosslinking density does not become excessively high, and curing comprising the phenoxy type epoxy resin may be performed smoothly.

In the epoxy resin component of the embodiment I, the bisphenol A type epoxy resin and the bisphenol F type epoxy resin are preferably used in combination as the bisphenol type epoxy resin. Use of the bisphenol A type epoxy resin and the bisphenol F type epoxy resin in combination enhances the bending strength of the obtained fiber-reinforced epoxy resin material. The content ratio of the bisphenol A type epoxy resin to the bisphenol F type epoxy resin is preferably from 20:80 to 80:20, more preferably 30:70 to 70:30, and even more preferably 40:60 to 60:40, in mass ratio.

In the case where a bisphenol type epoxy resin which is in a solid state at normal temperature (25° C.) is used as the bisphenol type epoxy resin, the weight average molecular weight of the bisphenol type epoxy resin is preferably 650 or more, more preferably 700 or more, and even more preferably 750 or more, and is preferably 10000 or less, more preferably 9500 or less, and even more preferably 9000 or less. If the weight average molecular weight falls within the above range, a crosslinked structure can be formed effectively. The weight average molecular weight may be measured by gel permeation chromatography (GPC) with polystyrene as a standard substance.

Examples of the bisphenol A type epoxy resin which is in a liquid state at normal temperature include jER (registered trademark) 827, jER828, jER828EL, jER828XA and jER834 (all of them are manufactured by Mitsubishi Chemical Corporation), Epotohto (registered trademark) YD-115, EpotohtoYD-115G, EpotohtoYD-115CA, EpotohtoYD-118T, EpotohtoYD-127, EpotohtoYD-128, EpotohtoYD-128G and EpotohtoYD-128S (all of them are manufactured by Tohto Kasei Co., Ltd.), EPICLON (registered trademark) 840, EPICLON840-S, EPICLON850 and EPICLON850-S (all of them are manufactured by DIC Corporation).

Examples of the bisphenol A type epoxy resin which is in a solid state at normal temperature include jER1001, jER1002, jER1003, jER1003F, jER1004, jER1004FS, jER1004F, jER1004AF, jER1055, jER1005F, jER1006FS, jER1007, jER1007FS, jER1008 and jER1009 (all of them are manufactured by Mitsubishi Chemical Corporation), EpotohtoYD-011, EpotohtoYD-012, EpotohtoYD-013, EpotohtoYD-014, EpotohtoYD-017, EpotohtoYD-019, EpotohtoYD-020N and EpotohtoYD-020H (all of them are manufactured by Tohto Kasei Co., Ltd.), EPICLON1050, EPICLON3050, EPICLON4050 and EPICLON7050 (all of them are manufactured by DIC Corporation), DER-661, DER-663U, DER-664, DER-667, DER-668 and DER-669 (all of them are manufactured by the Dow Chemical Company).

Examples of the bisphenol F type epoxy resin which is in a liquid state at normal temperature include jER806 and jER807 (both of them are manufactured by Mitsubishi Chemical Corporation); EPICLON830, EPICLON830-S and EPICLON835 (all of them are manufactured by DIC Corporation). Examples of the bisphenol F type epoxy resin which is in a solid state at normal temperature include jER4005P, jER4007P and jER4010P (all of them are manufactured by Mitsubishi Chemical Corporation).

Next, the epoxy resin component in the embodiment II will be described. If the novolac type epoxy resin, the bisphenol A type epoxy resin and the bisphenol F type epoxy resin are comprised as the epoxy resin component, and the content of the novolac type epoxy resin and the mass ratio of the bisphenol A type epoxy resin to the bisphenol F type epoxy resin are controlled in the embodiment II, the cured product of the epoxy resin composition exhibits enhanced toughness and strength, and the fiber-reinforced epoxy resin molded body obtained by using the prepreg exhibits enhanced strength.

The epoxy resin component in the embodiment II comprises the bisphenol A type epoxy resin and the bisphenol F type epoxy resin. The mass ratio of the bisphenol A type epoxy resin to the bisphenol F type epoxy resin (bisphenol A type epoxy resin/bisphenol F type epoxy resin) in the epoxy resin component of the embodiment II is preferably 0.3 or more, more preferably 0.4 or more, and even preferably 0.5 or more, and is preferably 3.0 or less, more preferably 2.5 or less, and even more preferably 2.0 or less. If the mass ratio falls within the above range, the tackiness of the prepreg can be enhanced while the strength and toughness of the cured product of the epoxy resin composition are maintained. If the mass ratio is less than 0.3, although the cured product of the epoxy resin composition exhibits a high strength, the toughness thereof is lowered. On the other hand, if the mass ratio is more than 3.0, although the cured product exhibits enhanced elongation, the strength thereof is lowered.

It is preferable that, the bisphenol A type epoxy resin and the bisphenol F type epoxy resin, among which one resin is in a liquid state at normal temperature (25° C.) and another resin is in a solid state at normal temperature, are used as the epoxy resin component of the embodiment II. Examples of such embodiment include: an embodiment of using the bisphenol A type epoxy resin which is in a liquid state at normal temperature and the bisphenol F type epoxy resin which is in a solid state at normal temperature; an embodiment of using the bisphenol A type epoxy resin which is in a solid state at normal temperature and the bisphenol F type epoxy resin which is in a liquid state at normal temperature; an embodiment of using the bisphenol A type epoxy resin which is in a liquid state at normal temperature, the bisphenol A type epoxy resin which is in a solid state at normal temperature and the bisphenol F type epoxy resin which is in a liquid state at normal temperature; and an embodiment of using the bisphenol A type epoxy resin which is in a liquid state at normal temperature, the bisphenol F type epoxy resin which is in a liquid state at normal temperature and the bisphenol F type epoxy resin which is in a solid state at normal temperature. Among them, the embodiment of using the bisphenol F type epoxy resin which is in a solid state at normal temperature is preferable.

The viscosity (25° C.) of the bisphenol A type epoxy resin which is in a liquid state at normal temperature is preferably 60 P or more, more preferably 75 P or more, and even more preferably 90 P or more, and is preferably 300 P or less, more preferably 250 P or less, and even more preferably 200 P or less. The viscosity of the epoxy resin can be measured with a viscoelasticity analyzer ("MCR301" manufactured by Anton Paar Corporation, applied torque: 6 mN·m). The epoxy equivalent (g/eq) of the bisphenol A type epoxy resin which is in a liquid state at normal temperature is preferably 170 or more, more preferably 175 or more, and even more preferably 180 or more, and is preferably 300 or less, more preferably 290 or less, and even more preferably 280 or less.

The epoxy equivalent (g/eq) of the bisphenol A type epoxy resin which is in a solid state at normal temperature is preferably 300 or more, more preferably 350 or more, and even more preferably 400 or more, and is preferably 20000 or less, more preferably 18000 or less, and even more preferably 16000 or less.

The viscosity (25° C.) of the bisphenol F type epoxy resin which is in a liquid state at normal temperature is preferably 9 P or more, more preferably 12 P or more, and even more preferably 15 P or more, and is preferably 300 P or less, more preferably 250 P or less, and even more preferably 200 P or less. The epoxy equivalent (g/eq) of the bisphenol F type epoxy resin which is in a liquid state at normal temperature is preferably 150 or more, more preferably 155 or more, and even more preferably 160 or more, and is preferably 300 or less, more preferably 290 or less, and even more preferably 280 or less.

The epoxy equivalent (g/eq) of the bisphenol F type epoxy resin which is in a solid state at normal temperature is preferably 300 or more, more preferably 350 or more, and even more preferably 400 or more, and is preferably 20000 or less, more preferably 18000 or less, and even more preferably 16000 or less.

The epoxy resin component of the embodiment II may consist of the novolac type epoxy resin, the bisphenol A type epoxy resin and the bisphenol F type epoxy resin, or may comprises, in addition to these resins, other epoxy resin having two epoxy groups within the molecule, namely, a difunctional epoxy resin. Specific examples of the difunctional epoxy resin include bisphenol type epoxy resins such as a hydrogenated product of a bisphenol A type epoxy resin, a hydrogenated product of a bisphenol F type epoxy resin, a bisphenol S type epoxy resin, a tetrabromobisphenol A type epoxy resin, and a bisphenol AD type epoxy resin. The bisphenol type epoxy resins may be used solely, or as a mixture of two or more of them. The amount of the bisphenol type epoxy resin used in the epoxy resin component is preferably 97 mass % or less, more preferably 96 mass % or less, and even more preferably 95 mass % or less.

The epoxy resin composition preferably comprises a curing agent. Examples of the curing agent include dicyandiamide; aromatic amines having an active hydrogen such as 4,4'-diaminodiphenylmethane, 4,4'-diaminodiphenylsulfone, 3,3'-diaminodiphenylsulfone, m-phenylenediamine, and m-xylylenediamine; aliphatic amines having an active hydrogen such as diethylenetriamine, triethylenetetramine, isophoronediamine, bis(aminomethyl)norbornane, bis(4-aminocyclohexyl)methane, and dimer acid ester of polyethyleneimine; modified amines obtained by reacting compounds such as an epoxy compound, acrylonitrile, phenol and formaldehyde and thiourea, with these amines having an active hydrogen; tertiary amines having no active hydrogen such as dimethylaniline, triethylenediamine, dimethylbenzylamine, and 2,4,6-tris(dimethylaminomethyl)phenol; imidazoles such as 2-methylimidazole and 2-ethyl-4-methylimidazole; polyamide resins; carboxylic anhydrides such as hexahydrophthalic anhydride, tetrahydrophthalic anhydride, methylhexahydrophthalic anhydride, and methylnadic anhydride; polycarboxylic acid hydrazides such as adipic acid hydrazide and naphthalene dicarboxylic acid hydrazide; polyphenol compounds such as novolac resins; polymercaptans such as an ester of thioglycolic acid and polyol; and Lewis acid complexes such as a boron trifluoride ethylamine complex. Among them, dicyandiamide is preferably used as the curing agent.

The added amount of dicyandiamide is preferably 13 g or more, more preferably 15 g or more, and even more preferably 17 g or more, and is preferably 40 g or less, more preferably 38 g or less, and even more preferably 35 g or less with respect to 1 mole of the epoxy group of the epoxy resin component. If the added amount of dicyandiamide is 13 g or more, the curing reaction may further progress, and the strength is further enhanced. If the added amount of dicyandiamide is 40 g or less, the elongation of the cured product of the resin composition is maintained, the strength of the interface between the reinforcing fiber and the epoxy resin is enhanced, and the strength of the fiber-reinforced epoxy resin material is further enhanced.

In combination with the curing agent, an appropriate curing accelerator can be used for enhancing the curing activity. As the curing accelerator, a urea derivative in which at least one of the hydrogens bonded to urea is substituted with a hydrocarbon group is preferred. The hydrocarbon group may be further substituted with, for example, a halogen atom, a nitro group, an alkoxy group, or the like. Examples of the urea derivative include derivatives of mono-urea compounds such as 3-phenyl-1,1-dimethylurea, 3-(parachlorophenyl)-1,1-dimethylurea, 3-(3,4-dichlorophenyl)-1,1-dimethylurea, 3-(orthomethylphenyl)-1,1-dimethylurea, 3-(paramethylphenyl)-1,1-dimethylurea, 3-(methoxyphenyl)-1,1-dimethylurea, and 3-(nitrophenyl)-1,1-dimethylurea; and derivatives of bis-urea compounds such as N,N-phenylene-bis(N',N'-dimethylurea) and N,N-(4-methyl-1,3-phenylene)-bis(N',N'-dimethylurea). Examples of a preferable combination include combinations of dicyandiamide with, as curing accelerators, urea derivatives such as 3-phenyl-1,1-dimethylurea, 3-(3,4-dichlorophenyl)-1,1-dimethylurea (DCMU), 3-(3-chloro-4-methylphenyl)-1,1-dimethylurea, and 2,4-bis(3,3-dimethylureido)toluene. Among them, the combination of dicyandiamide with 3-(3,4-dichlorophenyl)-1,1-dimethylurea (DCMU) as the curing accelerator is more preferred.

In the present invention, it is particularly preferred that dicyandiamide (DICY) is used as the curing agent and the urea derivative is used as the curing accelerator. In this case, the content ratio of dicyandiamide (DICY) to the urea derivative (DICY/urea derivative) is preferably 1.0 or more, more preferably 1.2 or more, and even more preferably 1.5 or more, and is preferably 3.0 or less, more preferably 2.8 or less, and even more preferably 2.5 or less, in mass ratio. In addition, the mass ratio (DICY/urea derivative) is most preferably 2. If the mass ratio DICY/urea derivative falls within the above range, the curing rate is high and the cured product has better properties.

The epoxy resin composition of the embodiments I and II may further comprise other components such as an oligomer, a high-molecular-weight compound, and organic or inorganic particles.

Examples of the oligomer that can be blended in the epoxy resin composition used in the present invention include a polyester polyurethane having a polyester backbone and a polyurethane backbone, a urethane(meth)acrylate having a polyester backbone and a polyurethane backbone and further having a (meth)acrylate group at a terminal of the molecular chain, and an indene oligomer.

As the high-molecular-weight compound that can be blended in the epoxy resin composition used in the present invention, a thermoplastic resin is suitably used. If the thermoplastic resin is blended, controllability of the viscosity of the resin, controllability of the handling of a prepreg sheet, and the effect of adhesion improvement are enhanced. Thus, blending of the thermoplastic resin is preferred.

Examples of the thermoplastic resin include polyvinyl acetal resins such as polyvinyl formal and polyvinyl butyral, polyvinyl alcohols; thermoplastic resins having amide bonds such as polyamide and polyimide; and thermoplastic resins having a sulfonyl group such as polysulfone. Each of polyamide, polyimide and polysulfone may have ether linkage or a functional group such as a carbonyl group in the main chain. Polyamide may have a substituent on the nitrogen atom of an amide group. The epoxy resin composition used in the present invention preferably comprises polyvinyl formal as the thermoplastic resin. If polyvinyl formal is comprised, the toughness and elongation of the cured product further are enhanced.

The content of the thermoplastic resin is preferably 2 parts or more by mass, more preferably 3 parts or more by mass, and even more preferably 4 parts or more by mass, and is preferably 12 parts or less by mass, and more preferably 8 parts or less by mass with respect to 100 parts by mass of the epoxy resin component. If the content of the thermoplastic resin is 2 parts or more by mass, the epoxy resin composition has better elongation and tackiness can be provided thereto. On the other hand, if the content of the thermoplastic resin exceeds 12 parts by mass, the epoxy resin composition may be solidified at normal temperature. Thus, the impregnation to the reinforcing fiber may be lowered and a void may be caused during the production of a prepreg.

As organic particles that can be blended in the epoxy resin composition used in the present invention, rubber particles and thermoplastic resin particles may be used. These particles provide effects of improving the toughness of the resin and improving the impact resistance of the fiber-reinforced composite material. Furthermore, as rubber particles, crosslinked rubber particles and core-shell rubber particles in which a different type of polymer is graft-polymerized on the surfaces of crosslinked rubber particles are preferably used.

As commercially available crosslinked rubber particles, XER-91 (manufactured by JSR Corporation) composed of a crosslinked product of a carboxyl-modified butadiene-acrylonitrile copolymer, CX-MN series (manufactured by Nippon Shokubai Co., Ltd.) composed of acrylic rubber fine particles, YR-500 series (manufactured by Tohto Kasei Co., Ltd.), and the like can be used. As commercially available core-shell rubber particles, PARALOID EXL-2655 (manufactured by Kureha Corporation) composed of a butadiene-alkyl methacrylate-styrene copolymer, Staphyloid AC-3355 and TR-2122 (manufactured by Takeda Pharmaceutical Company Limited) composed of an acrylic acid ester-methacrylic acid ester copolymer, PARALOID EXL-2611 and EXL-3387 (registered trademarks, trade names, manufactured by Rohm and Haas Company) composed of a butyl acrylate-methyl methacrylate copolymer, and the like can be used.

In addition, as thermoplastic resin particles, particles of polyamide or polyimide are preferably used. As commercially available polyamide particles, trade name SP-500 manufactured by Toray Industries Inc., Orgasol (registered trademark) manufactured by Elf Atochem, and the like can be used.

As inorganic particles, silica, alumina, smectite, synthetic mica, and the like can be blended in the epoxy resin composition. These inorganic particles are blended in the epoxy resin composition, mainly in order to control rheology, namely, to increase the viscosity or to impart thixotropy.

The resin component of the tubular body made of the fiber-reinforced epoxy resin material according to the present invention preferably consists of the above epoxy resin composition, but a commercially available epoxy resin composition may be used in combination as long as it does not impair the effect of the present invention. When the commercially available epoxy resin composition is used in combination, the content of the commercially available epoxy resin composition in the resin component of the tubular body made of the fiber-reinforced epoxy resin material is preferably 95 mass % or less, more preferably 90 mass % or less, and even more preferably 80 mass % or less.

Examples of the reinforcing fiber used for the fiber-reinforced epoxy resin material in the present invention include a carbon fiber, a glass fiber, an aramid fiber, a boron fiber, an alumina fiber, and a silicon carbide fiber. In addition, two or more of these fibers can be mixed. Among them, the carbon fiber is preferably used.

Examples of the carbon fiber include carbon fibers such as acrylic type, pitch type, and rayon type. Among them, acrylic type carbon fiber having high tensile strength is preferred. As the form of the carbon fiber, a so-called twisted yarn which is a carbon fiber obtained by twisting and baking a precursor fiber, a so-called untwisted yarn which is a carbon fiber obtained by untwisting the twisted yarn, a non-twisted yarn obtained by conducting thermal treatment on a precursor fiber without substantially twisting the precursor fiber, and the like can be used. The non-twisted yarn or the untwisted yarn is preferable in view of balance between the moldability and the strength properties of the fiber-reinforced composite material, and the non-twisted yarn is more preferable in terms of handling such as adhesion between prepreg sheets. In addition, the carbon fiber in the present invention can also include a graphite fiber.

The tensile modulus of the reinforcing fiber is preferably 10 tf/mm$^2$ (98 GPa) or more and more preferably 24 tf/mm$^2$ (235 GPa) or more, and is preferably 70 tf/mm$^2$ (686 GPa) or less and more preferably 50 tf/mm$^2$ (490 GPa) or less. The tensile modulus is measured according to JIS-R 7601 (1986) "testing methods for carbon fibers". When the tensile modulus of the reinforcing fiber falls within the above range, a tubular body having high bending strength is obtained.

The content of the reinforcing fiber in the fiber-reinforced epoxy resin material according to the present invention is preferably 35 mass % or more, more preferably 50 mass % or more, even more preferably 65 mass % or more, and particularly preferably 70 mass % or more, and is preferably 85 mass % or less, more preferably 84 mass % or less, even more preferably 80 mass % or less, and particularly preferably 75 mass % or less. This is because if the content of the reinforcing fiber falls within the above range, a favorable fiber-reinforced epoxy resin material utilizing the high strength of the resin sufficiently is provided.

The present invention further provides a prepreg used for preparing the fiber-reinforced epoxy resin material. Examples of such prepreg include a prepreg obtained by impregnating a reinforcing fiber with an epoxy resin composition. Examples of the epoxy resin composition and the reinforcing fiber used for the prepreg include those usable for the above-described fiber-reinforced epoxy resin material. It is noted that the prepreg is a molded intermediate material which is obtained by impregnating the reinforcing fiber with the epoxy resin composition and in which the epoxy resin composition is in an uncured or semi-cured state. The fiber-reinforced epoxy resin molded body is obtained by curing the epoxy resin composition contained in the prepreg of the present invention.

Preferable prepregs include: a prepreg comprising an epoxy resin composition and a reinforcing fiber, wherein the epoxy resin composition comprises a novolac type epoxy resin as an epoxy resin component, and a cured product of the epoxy resin composition has a swelling ratio in a range from 20 mass % to 44 mass % in methyl ethyl ketone; and a prepreg comprising an epoxy resin composition and a reinforcing fiber, wherein the epoxy resin composition comprises a novolac type epoxy resin, a bisphenol A type epoxy resin and a bisphenol F type epoxy resin as an epoxy resin component, a content of the novolac type epoxy resin in the entire epoxy resin component ranges from 2 mass % to 19 mass %, a mass ratio of the bisphenol A type epoxy resin to the bisphenol F type epoxy resin (bisphenol A type epoxy resin/bisphenol F type epoxy resin) in the epoxy resin component ranges from 0.3 to 3.0, an epoxy equivalent (g/eq) of the entire epoxy resin component ranges from 200 to 400, and a cured product of the epoxy resin composition has a swelling ratio in a range from 20 mass % to 44 mass % in methyl ethyl ketone.

If the novolac type epoxy resin, the bisphenol A type epoxy resin and the bisphenol F type epoxy resin are comprised as the epoxy resin component, and the contents thereof are controlled, the cured product of the epoxy resin composition exhibits enhanced toughness and strength, while the prepreg exhibits enhanced tackiness and drapability. In addition, the swelling ratio in methyl ethyl ketone is an index of the crosslinking density of the epoxy resin composition. The cured product of the epoxy resin composition having a swelling ratio in methyl ethyl ketone within the above range has appropriate elongation and gives excellent adhesion to the reinforcing fiber. As a result, in the fiber-reinforced epoxy resin molded body which is obtained from the prepreg of the present invention, the strength of the interface between the reinforcing fiber and the matrix resin is enhanced and the reinforcement effect with the reinforcing fiber is increased, thus the resultant fiber-reinforced epoxy resin molded body exhibits further enhanced mechanical strength.

The resin component of the prepreg according to the present invention preferably consist of the above epoxy resin composition, but a commercially available epoxy resin composition may be used in combination as long as it does not impair the effect of the present invention. When the commercially available epoxy resin composition is used in combination, the content of the commercially available epoxy resin composition in the resin component is preferably 95 mass % or less, more preferably 90 mass % or less, and even more preferably 80 mass % or less.

The content of the resin component in the prepreg is preferably 15 mass % or more, more preferably 20 mass % or more, and even more preferably 25 mass % or more, and is preferably 65 mass % or less, more preferably 60 mass % or less, and even more preferably 55 mass % or less. If the content of the resin component falls within the above range, a favorable fiber-reinforced epoxy resin molded body utilizing the high strength of the resin sufficiently is provided.

The content of the reinforcing fiber in the prepreg of the present invention is preferably 35 mass % or more, more preferably 50 mass % or more, even more preferably 65 mass % or more, and particularly preferably 70 mass % or more, and is preferably 85 mass % or less, more preferably 84 mass % or less, even more preferably 80 mass % or less, and particularly preferably 75 mass % or less. This is because if the content of the reinforcing fiber falls within the above range, a favorable fiber-reinforced epoxy resin material utilizing the high strength of the resin sufficiently is provided.

Examples of the form of the reinforcing fiber in the prepreg include a unidirectionally oriented long fiber, a bidirectional woven product, a multiaxial woven product, a nonwoven fabric, a mat, a knit, and a braid. Here, the long fiber means a single fiber or fiber bundle which is substantially continuous for 10 mm or more. A so-called unidirectional prepreg in which a long fiber is oriented in one direction can highly utilize the strength in the fiber direction, because the fibers have the same direction and less bends. In addition, with regard to the unidirectional prepreg, when a plurality of prepregs are appropriately laminated such that the arrangement directions of the reinforcing fibers thereof are different from each other and then molding is conducted, designing the elastic modulus and the strength of a molded product in each direction becomes easy.

The shape of the prepreg is preferably a sheet shape. When the prepreg is made as a sheet shape, the thickness thereof is preferably 0.01 mm or more and more preferably 0.03 mm or more, and is preferably 1.0 mm or less and more preferably 0.9 mm or less.

The density of the prepreg is preferably 1.45 g/cm$^3$ or more, more preferably 1.47 g/cm$^3$ or more, and even more preferably 1.48 g/cm$^3$ or more, and is preferably 1.75 g/cm$^3$ or less, more preferably 1.72 g/cm$^3$ or less, and even more preferably 1.69 g/cm$^3$ or less. This is because if the density falls within the above range, a favorable fiber-reinforced epoxy resin material utilizing the reinforcement effect of the carbon fiber sufficiently is provided.

A known method can be used to manufacture the prepreg of the present invention. For example, the prepreg can be produced by impregnating the reinforcing fiber such as a carbon fiber with the epoxy resin composition. Specifically, the prepreg can be produced by a method such as a wet method in which the epoxy resin composition is dissolved in a solvent such as methyl ethyl ketone and methanol to decrease the viscosity thereof and the reinforcing fiber is impregnated; and a hot-melt method in which the epoxy resin composition is heated to decrease the viscosity thereof and the reinforcing fiber is impregnated. The wet method is a method in which the reinforcing fiber is immersed in a solution of the epoxy resin composition, then pulled out, and heated with an oven or the like to evaporate the solvent, thereby obtaining a prepreg. The hot-melt method includes a method in which the reinforcing fiber is directly impregnated with the epoxy resin composition whose viscosity has been decreased by heating, and a method in which the epoxy resin composition is coated on a releasing paper or the like to produce a film and the film is laminated on both sides or one side of the reinforcing fiber, and heated to make the reinforcing fiber impregnated with the epoxy resin composition, thereby obtaining a prepreg. The hot-melt method is preferred since the solvent substantially does not remain in the prepreg.

The present invention further provides a tubular body made of the above-described fiber-reinforced epoxy resin material. A known method can be used to manufacture the tubular body made of the fiber-reinforced epoxy resin material. Exemplified is a method in which a prepreg is produced by impregnating the reinforcing fiber such as a carbon fiber with the epoxy resin composition, cutting the prepreg into a shape of each material constituting the tubular body, laminating each material, and then pressuring the laminated while heating.

In addition, the fiber-reinforced composite material can also be obtained without using any prepreg which is an intermediate base material. Specifically, the tubular molded body may be also obtained by a filament winding molding method in which a roving of the reinforcing fiber is impregnated with the epoxy resin composition and the roving is wound around a core roller, then the resin is heated to be cured. The surface of the tubular molded body may be subjected to cutting, painting or the like.

The method of applying pressure to a laminate of prepregs while heating the laminate includes a wrapping tape method and an inner-pressure molding method. The wrapping tape method is a method in which prepregs are wound around a core roller such as a mandrel to obtain a molded body. Specifically, the prepregs are wound around the mandrel, a wrapping tape composed of a thermoplastic resin film is wound around the outside of the prepregs for fixing the prepregs and providing pressure to the prepregs, the resin is heated in an oven to be cured, and then the core roller is removed to obtain a tubular molded body. The surface of the tubular molded body may be subjected to cutting, painting or the like.

The inner-pressure molding method is a method in which prepregs are wound around an inner-pressure provider such as a tube made of a thermoplastic resin to make a preform, then the preform is placed in a mold, and a high-pressure gas is introduced into the inner-pressure provider to apply a pressure while the mold is heated, to conduct molding.

It is preferable that the number of laminated prepregs constituting the tubular body made of the fiber-reinforced epoxy resin material, the content of the reinforcing fiber, the thickness of each prepreg, and the like are appropriately changed according to a desired property. In particular, required rigidity and strength are preferably provided to the tubular body by appropriately arranging a bias prepreg whose reinforcing fiber is arranged so as to be tilted relative to the axis of the tubular body, a straight prepreg whose reinforcing fiber is arranged parallel to the axis of the tubular body, and a hoop prepreg whose reinforcing fiber is arranged perpendicular to the axis of the tubular body.

The tubular body is preferably formed by winding multiple prepregs to laminate them and curing the resin composition contained in these prepregs. The number of laminated prepregs constituting the tubular body is preferably 5 or more, more preferably 7 or more, and even more preferably 9 or more, and is preferably 30 or less, more preferably 28 or less, and even more preferably 26 or less.

In the case that the tubular body comprises multiple prepregs, the prepreg of the present invention is preferably used as the outermost prepreg locating on the outermost side. That is, the fiber-reinforced epoxy resin material of the present invention is preferably used as the fiber-reinforced resin (hereinafter also called as FRP) material locating on the outermost side of the tubular body. The initial breakage of the tubular body occurs on the outermost layer of the tubular body. Thus, if the fiber-reinforced epoxy resin material exhibiting excellent mechanical strength of the present invention is used for the outermost layer of the tubular body, the initial breakage of the tubular body can be prevented, and the strength of the tubular body is further enhanced. In addition, in the case that the tubular body comprises three or more prepregs, the prepregs of the present invention are preferably used for two prepregs, the outermost prepreg and the prepreg in contact with the inside of the outermost prepreg. It is noted that, as the outermost prepreg and the prepreg in contact with the inside of the outermost prepreg, the different prepregs may be used, but the same prepregs are preferably used.

The tensile modulus of the reinforcing fiber contained in the outermost prepreg and/or the prepreg in contact with the inside of the outermost prepreg is preferably 10 tf/mm$^2$ (98 GPa) or more, more preferably 15 tf/mm$^2$ (147 GPa) or more, and even more preferably 20 tf/mm$^2$ (196 GPa) or more, and is preferably 38 tf/mm$^2$ (373 GPa) or less, and more preferably 30 tf/mm$^2$ (294 GPa) or less. When the tensile modulus of the reinforcing fiber contained in these prepregs falls within the above range, the initial breakage of the tubular body can be further suppressed.

In addition, it is preferable that a prepreg (hereinafter also called as light weight prepreg) having a smaller density than the outermost prepreg is used as at least one of the prepregs locating on the inner side of the outermost prepreg. If the prepreg having a small density is used, the weight of the tubular body can be decreased. Generally, a prepreg having a small density contains a small amount of the reinforcing fiber, thus if such prepreg is used, the mechanical strength of the tubular body tends to decrease. However, since the initial breakage of the tubular body is suppressed by using the prepreg of the present invention as the outermost prepreg, the weight of the tubular body can be decreased while the mechanical strength of the tubular body is maintained.

The density difference between the outermost prepreg and the light weight prepreg (outermost prepreg–light weight prepreg) is preferably 0.08 g/cm$^3$ or more, more preferably 0.10 g/cm$^3$ or more, and even more preferably 0.12 g/cm$^3$ or more, and is preferably 0.28 g/cm$^3$ or less, more preferably 0.26 g/cm$^3$ or less, and even more preferably 0.24 g/cm$^3$ or less. If the density difference falls within the above range, the weight of the tubular body can be decreased while the strength of the tubular body is maintained.

The light weight prepreg is not particularly limited, and a conventionally known prepreg can be used. In addition, the prepreg of the present invention is also preferably used as the light weight prepreg. The density of the light weight prepreg is preferably 1.35 g/cm$^3$ or more and more preferably 1.40 g/cm$^3$ or more, and is preferably 1.55 g/cm$^3$ or less and more preferably 1.50 g/cm$^3$ or less.

When the light weight prepreg is used, the reinforcing fiber contained in the light weight prepreg preferably has a tensile modulus larger than the reinforcing fiber contained in the outermost prepreg. By such construction, the weight of the tubular body can be decreased while the mechanical strength of the tubular body is maintained. The tensile modulus of the reinforcing fiber contained in the light weight prepreg is preferably 30 tf/mm$^2$ (294 GPa) or more, more preferably 40 tf/mm$^2$ (392 GPa) or more, and even more preferably 46 tf/mm$^2$ (451 GPa) or more, and is preferably 70 tf/mm$^2$ (686 GPa) or less, more preferably 60 tf/mm$^2$ (588 GPa) or less, and even more preferably 50 tf/mm$^2$ (490 GPa) or less. When the tensile modulus of the reinforcing fiber contained in the light weight prepreg falls within the above range, the weight of the tubular body can be decreased while the mechanical strength of the tubular body is maintained.

The larger the number of the light weight prepreg is, the lighter the mass of the tubular body is. Although the location of the light weight prepreg is not particularly limited, it is preferable that the light weight prepreg is located on as inner side as possible. In other words, the innermost prepreg locating on the innermost side is preferable the light weight prepreg. In addition, two or more of the light weight prepregs may be used. In this case, the light weight prepregs are preferably arranged consecutively. That is, it is more preferable that the desired number of light weight prepregs are arranged consecutively from the innermost prepreg.

As the tubular body, in one preferable embodiment, a tubular body is obtained by winding and laminating multiple prepregs, wherein the prepreg of the present invention is used as the outermost prepreg locating on the outermost side, and at least one of the prepregs locating on the inner side of the outermost prepreg is the light weight prepreg having a smaller density than the outermost prepreg. Specifically, a tubular body is preferably obtained by winding and laminating n pieces of prepregs, wherein the prepreg of the present invention is used as the outermost prepreg and the prepreg in contact with the inside of the outermost prepreg, and the light weight prepreg is used as the prepregs beginning from the innermost prepreg to the (n−3)th piece (n is five or more). For example, in the case that the tubular body consists of eight pieces of prepregs, in one preferable embodiment, the prepreg of the present invention is used as the outermost prepreg (the eighth piece prepreg) and the prepreg (the seventh piece prepreg) in contact with the inside of the outermost prepreg, and the light weight prepregs are used as the prepregs beginning from the innermost prepreg (the first piece prepreg) to the fifth piece prepreg. The prepregs having different densities of the present invention are preferably used as the outermost prepreg, the prepreg in contact with the inside the outermost prepreg and the light weight prepreg, respectively.

The length of the tubular body is preferably 40 inch (101.6 cm) or more and more preferably 41 inch (104.1 cm) or more, and is preferably 49 inch (124.5 cm) or less and more preferably 48 inch (121.9 cm) or less. If the length of the tubular body falls within the above range, the handling of a golf club using a golf club shaft which is formed from the tubular body becomes better. In addition, the mass of the tubular body is preferably 30 g or more and more preferably 35 g or more, and is preferably 80 g or less and more preferably 75 g or less. If the mass is 30 g or more, the shaft has sufficient thickness, thus the mechanical strength thereof is further enhanced. If the mass is 80 g or less, the shaft is not overweight, thus the handling thereof becomes better.

The thickness of the tubular body is preferably 0.5 mm or more and more preferably 0.6 mm or more, and is preferably 4 mm or less and more preferably 3.5 mm or less. If the thickness of the tubular body falls within the above range, good whip can be obtained. In addition, the gravity center and the whip location of the tubular body can be controlled by adjusting the location of the low-thickness part of the tubular body.

The tubular body made of the fiber-reinforced epoxy resin material according to the present invention can be suitably used for, for example, a golf club shaft, a fishing rod, a tennis racket, a badminton racket, and the like.

EXAMPLES

Hereinafter, the present invention will be described in detail by way of examples. The present invention is not limited to the examples described below. Various changes and modifications can be made without departing from the spirit and scope of the present invention.
[Evaluation Method]
(1) Production of Test Piece
[Production of Test Piece for Tensile Test of Resin and Test Piece for Swelling Test in Methyl Ethyl Ketone]

Methyl ethyl ketone (MEK) solutions of epoxy resins were prepared by dissolving epoxy resin components in MEK so as to have the same epoxy resin composition formulations as shown in Tables 1 to 7 (MEK content: 30%). The obtained MEK solutions of epoxy resins were dried and heated to melt, and a curing agent and a curing accelerator were added thereto, followed by stirring. The obtained epoxy resin compositions were poured into a 2 mm-thick casting mold and treated at 130° C. for 2 hours to be cured, respectively. A test piece for tensile test was molded from the cured resin plate according to JIS-K 7162 (1994) test piece 1 BA. In addition, a test piece having a square shape of 2 cm×2 cm was cut out to make a test piece for swelling test in methyl ethyl ketone.
[Test Piece for Tensile Test of Fiber-Reinforced Epoxy Resin Material]

Prepregs were cut, and ten layers of prepregs were laminated such that the fibers thereof were oriented in the same direction. The laminate was sandwiched between 0.1 mm thick releasing sheets, and pressed with a 1 mm spacer under the conditions of 80° C.×30 minutes+130° C.×2 hours to cure the epoxy resins, thereby obtaining fiber-reinforced epoxy resin material sheets. The obtained fiber-reinforced epoxy resin material sheets were cut into a size of 100 mm length in the direction perpendicular to the fiber and 10 mm width in the fiber direction, to produce test pieces for tensile test.
(2) Swelling Test in Methyl Ethyl Ketone The above-obtained test piece (2 cm square, thickness: 2 mm) for swelling test in methyl ethyl ketone was immersed into 100 mL of methyl ethyl ketone and kept at 40° C. for 48 hours. The mass of the test piece was measured before and after the immersion, and the swelling ratio in methyl ethyl ketone was calculated based on the following.

Swelling ratio=100×[mass of test piece after swelling test−mass of test piece before swelling test]/mass of test piece before swelling test (3) Tensile Test (Maximum Stress)

Figure 2:
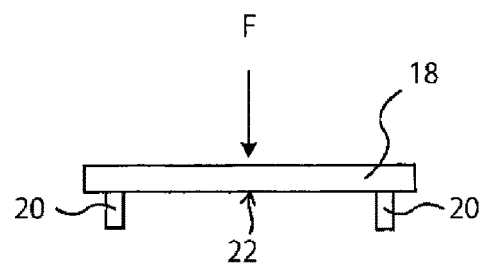
FIG. 2 is an explanatory drawing illustrating an embodiment of a bending test.

As shown in FIG. 1, a tensile test was conducted at a tension speed of 1 mm/min with a Shimadzu autograph (manufactured by Shimadzu Corporation). FIG. 1(a) schematically illustrates a tensile test method for a test piece 12 composed of a cured product of an epoxy resin composition. FIG. 1(b) is a side view when chucks 10 pinching the test piece 12 in FIG. 1(a) are observed from its side. It is noted that in FIG. 1(b), recesses and projections for preventing slip are provided inside the chuck 10 but not shown. FIG. 1(c) schematically illustrates a tensile test method for a fiber-reinforced epoxy resin material. In FIG. 1(a) and FIG. 1(c), the arrow direction is a direction for the tensile test. As shown in FIG. 1(c), aluminum tags 14 of 4 mm length×1.5 mm width×0.5 mm thickness were attached to a test piece 15 composed of a fiber-reinforced epoxy resin material, by means of a cyanoacrylate adhesive, and the tensile test was conducted in a direction perpendicular (90 degrees) to the direction of a reinforcing fiber 16. The tensile property of the cured product of the epoxy resin composition was shown as maximum stress×elongation at maximum stress/2 (MPa·%).
(4) Three-Point Bending Test As shown in FIG. 2, a tubular body 18 was supported at two points from its bottom such that the distance between fulcrums 20, 20 was 300 mm, a load F was applied at a midpoint 22 between the fulcrums from above the tubular body 18, and the load value (peak value) was measured when the tubular body was broken. It is noted that the midpoint 22 at which the load F was applied to the tubular body 18 was set to the center portion of the tubular body. The measurement was conducted under the following conditions.

Test apparatus: an autograph manufactured by Shimadzu Corporation

Loading rate: 20 mm/min
(5) Prepreg Tackiness Test

Tackiness of the prepreg was measured using an adhesion tester for rubber & adhesive body (PICMA tackiness tester P-2 manufactured by Toyo Seiki Co., Ltd). The measurement was conducted under the conditions of falling speed: 1000 mm/sec, pressing time: 0 second, and tearing off speed: 1000 mm/sec (adhesion time: one second).

(6) Drapability Test

Drapability of the prepreg was evaluated with easiness of winding the prepreg in the production of a tubular body. "O" indicates a prepreg showing good operability, and "X" indicates a prepreg showing bad operability.

[Production of Prepreg]

Methyl ethyl ketone (MEK) solutions of epoxy resins were prepared by dissolving epoxy resins in MEK so as to have the formulations shown in Tables 1 and 7 (MEK content: 30% by mass). A curing agent and a curing accelerator were added to the obtained MEK solutions of epoxy resins and stirred, to prepare solutions of epoxy resin compositions. The solutions of the epoxy resin compositions were applied to the releasing paper and dried at 80° C. to 90° C. for three minutes to produce epoxy resin composition sheets. With the obtained epoxy resin composition sheets, carbon fiber sheets having a fiber mass per unit area of 100 g/m² were impregnated by a hot-melt method to produce prepregs having a carbon fiber content of 70 mass %.

Evaluation results of epoxy resin compositions, prepregs and fiber-reinforced epoxy resin materials are shown in Tables 1 and 7.

TABLE 1

| | | | Prepreg No. | PP1 | PP2 | PP3 | PP4 | PP5-1 | PP5-2 | PP5-3 | PP5-4 | PP5-5 | PP5-6 | PP5-7 |
|---|---|---|---|---|---|---|---|---|---|---|---|---|---|---|
| Epoxy resin composition | Formulation (part by mass) | Epoxy resin component | Bisphenol A type epoxy resin (equivalent: 190 g/eq) | 40 | 40 | 40 | 40 | | | | 40 | | | |
| | | | Bisphenol F type epoxy resin (equivalent: 165 g/eq) | — | — | — | — | | | | — | | | |
| | | | Bisphenol F type epoxy resin (equivalent: 1070 g/eq) | 41 | 41 | 41 | 41 | | | | 41 | | | |
| | | | Phenolic novolac type epoxy resin (equivalent: 180 g/eq) | 7 | 7 | 7 | 7 | | | | 7 | | | |
| | | | Phenoxy type epoxy resin (equivalent: 8000 g/eq) | — | 1 | 4 | 7 | | | | 10 | | | |
| | | Thermoplastic resin | Polyvinyl formal | 4 | 4 | 4 | 4 | | | | 4 | | | |
| | | Curing agent | Dicyandiamide | 5.2 | 5.2 | 5.2 | 5.2 | | | | 5.2 | | | |
| | | Curing accelerator | Urea derivative | 2.6 | 2.6 | 2.6 | 2.6 | | | | 2.6 | | | |
| | Epoxy equivalent of entire epoxy resin component (g/eq) | | | 305.8 | 309.2 | 319.2 | 329.2 | | | | 339.1 | | | |
| | Novolac type/phenoxy type mass ratio | | | — | 7.00 | 1.75 | 1.00 | | | | 0.70 | | | |
| | Novolac type epoxy resin content (mass %) | | | 8.0 | 7.9 | 7.6 | 7.4 | | | | 7.1 | | | |
| | Polyvinyl formal content with respect to 100 parts by mass of epoxy resin component (part by mass) | | | 4.5 | 4.5 | 4.3 | 4.2 | | | | 4.1 | | | |
| | Dicyandiamide content (g/epoxy 1 mol) | | | 18.1 | 18.1 | 18.0 | 18.0 | | | | 18.0 | | | |
| | MEK swelling ratio (mass %) | | | 32.5 | 33.1 | 35.3 | 37.2 | | | | 39.0 | | | |
| | Tensile strength (MPa) | | | 100 | 105 | 110 | 105 | | | | 103 | | | |
| | Breakage elongation (%) | | | 13 | 16 | 20 | 23 | | | | 27 | | | |
| | Tensile property (MPa · %) | | | 500 | 600 | 710 | 710 | | | | 720 | | | |
| Reinforcing fiber | Type | | | T800SC | T800SC | T800SC | T800SC | T800SC | M40JB | XN-15 | T700SC | M50JB | YSH-60A | YS-80A |
| | Tensile modulus (tf/mm²) | | | 30 | 30 | 30 | 30 | 30 | 40 | 15 | 24 | 50 | 60 | 80 |
| | Density (g/cm³) | | | 1.59 | 1.59 | 1.59 | 1.59 | 1.59 | 1.48 | 1.72 | 1.67 | 1.48 | 1.50 | 1.46 |
| Prepreg | Resin content (mass %) | | | 30 | 30 | 30 | 30 | 30 | 45 | 16 | 17 | 53 | 58 | 65 |
| | Reinforcing fiber content (mass %) | | | 70 | 70 | 70 | 70 | 70 | 55 | 84 | 83 | 47 | 42 | 35 |
| | Fiber-reinforced epoxy resin material tensile strength (MPa) | | | 55 | 57 | 61 | 67 | 69 | 67 | 71 | 73 | 66 | 64 | 61 |

TABLE 2

| Prepreg No. | | | | PP6 | PP7-1 | PP7-2 | PP8 | PP9 | PP10 | PP11 |
|---|---|---|---|---|---|---|---|---|---|---|
| Epoxy resin composition | Formulation (part by mass) | Epoxy resin component | Bisphenol A type epoxy resin (equivalent: 190 g/eq) | 40 | 40 | 40 | — | 40 | 40 | |
| | | | Bisphenol F type epoxy resin (equivalent: 165 g/eg) | — | — | — | 40 | — | — | |
| | | | Bisphenol F type epoxy resin (equivalent: 1070 g/eq) | 41 | 41 | — | — | 41 | 41 | |
| | | | Phenolic novolac type epoxy resin (equivalent: 180 g/eq) | 7 | 7 | — | — | — | 3 | |
| | | | Phenoxy type epoxy resin (equivalent: 8000 g/eq) | 15 | 20 | 28.5 | 39 | 4 | 4 | |
| | | Thermoplastic resin | Polyvinyl formal | 4 | 4 | 4 | 4 | 4 | 4 | |
| | | Curing agent | Dicyandiamide | 5.2 | 5.2 | 3.9 | 4.5 | 4.5 | 4.7 | |
| | | Curing accelerator | Urea derivative | 2.6 | 2.6 | 2.0 | 2.3 | 2.3 | 2.4 | |
| | Epoxy equivalent of entire epoxy resin component (g/eq) | | | 355.7 | 372.1 | 320.0 | 319.5 | 340.9 | 330.8 | |
| | Novolac type/phenoxy type mass ratio | | | 0.47 | 0.35 | 0 | 0 | 0 | 0.75 | |
| | Novolac type epoxy resin content (mass %) | | | 6.8 | 6.5 | 0.0 | 0.0 | 0.0 | 3.4 | |
| | Polyvinyl formal content with respect to 100 parts by mass of epoxy resin component (part by mass) | | | 3.9 | 3.7 | 5.8 | 5.1 | 4.7 | 4.5 | |
| | Dicyandiamide content (g/epoxy 1 mol) | | | 18.0 | 17.9 | 18.2 | 18.2 | 18.0 | 17.7 | |
| | MEK swelling ratio (mass %) | | | 43.2 | 47.1 | 36.2 | 36.1 | 38.1 | 34.2 | |
| | Tensile strength (MPa) | | | 95 | 86 | 84 | 82 | 87 | 97 | |
| | Breakage elongation (%) | | | 29 | 29 | 26 | 27 | 26 | 23 | |
| | Tensile property (MPa · %) | | | 680 | 590 | 510 | 530 | 650 | 680 | |
| Reinforcing fiber | Type | | | T800SC | T800SC | M40JB | T800SC | T800SC | T800SC | T800SC |
| | Tensile modulus(tf/mm$^2$) | | | 30 | 30 | 40 | 30 | 30 | 30 | 30 |
| Prepreg | Density (g/cm$^3$) | | | 1.59 | 1.59 | 1.48 | 1.59 | 1.59 | 1.59 | 1.59 |
| | Resin content (mass %) | | | 30 | 30 | 45 | 30 | 30 | 30 | 30 |
| | Reinforcing fiber content (mass %) | | | 70 | 70 | 55 | 70 | 70 | 70 | 70 |
| | Fiber-reinforced epoxy resin material tensile strength (MPa) | | | 70 | 68 | 66 | 52 | 50 | 54 | 58 |

TABLE 3

| Prepreg No. | | | | PP12-1 | PP12-2 | PP12-3 | PP12-4 | PP12-5 | PP12-6 | PP12-7 | PP13-1 | PP13-2 |
|---|---|---|---|---|---|---|---|---|---|---|---|---|
| Epoxy resin composition | Formulation (part by mass) | Epoxy resin component | Bisphenol A type epoxy resin (equivalent: 190 g/eq) | | | | 40 | | | | 40 | |
| | | | Bisphenol F type epoxy resin (equivalent: 165 g/eg) | | | | — | | | | — | |
| | | | Bisphenol F type epoxy resin (equivalent: 1070 g/eq) | | | | 41 | | | | 41 | |
| | | | Phenolic novolac type epoxy resin (equivalent: 180 g/eq) | | | | 15 | | | | 21 | |
| | | | Phenoxy type epoxy resin (equivalent: 8000 g/eq) | | | | 4 | | | | 4 | |
| | | Thermoplastic resin | Polyvinyl formal | | | | 4 | | | | 4 | |
| | | Curing agent | Dicyandiamide | | | | 6.0 | | | | 6.8 | |
| | | Curing accelerator | Urea derivative | | | | 3.0 | | | | 3.4 | |
| | Epoxy equivalent of entire epoxy resin component (g/eq) | | | | | | 300.6 | | | | 289.6 | |
| | Novolac type/phenoxy type mass ratio | | | | | | 3.75 | | | | 5.25 | |
| | Novolac type epoxy resin content (mass %) | | | | | | 15.0 | | | | 19.8 | |
| | Polyvinyl formal content with respect to 100 parts by mass of epoxy resin component (part by mass) | | | | | | 4.0 | | | | 3.8 | |
| | Dicyandiamide content (g/epoxy 1 mol) | | | | | | 18.0 | | | | 18.6 | |
| | MEK swelling ratio (mass %) | | | | | | 30.1 | | | | 28.2 | |
| | Tensile strength (MPa) | | | | | | 118 | | | | 125 | |

TABLE 3-continued

| | Prepreg No. | | | PP12-1 | PP12-2 | PP12-3 | PP12-4 | PP12-5 | PP12-6 | PP12-7 | PP13-1 | PP13-2 |
|---|---|---|---|---|---|---|---|---|---|---|---|---|
| | Breakage elongation (%) | | | | | | 16 | | | | 11 | |
| | Tensile property (MPa · %) | | | | | | 700 | | | | 500 | |
| Reinforcing fiber | Type | | | T800SC | M40JB | XN-15 | T700SC | M50JB | YSH-60A | YS-80A | T800SC | M40JB |
| | Tensile modulus (tf/mm$^2$) | | | 30 | 40 | 15 | 24 | 50 | 60 | 80 | 30 | 40 |
| Prepreg | Density (g/cm$^3$) | | | 1.59 | 1.48 | 1.72 | 1.67 | 1.48 | 1.50 | 1.46 | 1.59 | 1.48 |
| | Resin content (mass %) | | | 30 | 45 | 16 | 17 | 53 | 58 | 65 | 30 | 45 |
| | Reinforcing fiber content (mass %) | | | 70 | 55 | 84 | 83 | 47 | 42 | 35 | 70 | 55 |
| | Fiber-reinforced epoxy resin material tensile strength (MPa) | | | 60 | 58 | 62 | 63 | 57 | 56 | 53 | 52 | 50 |

TABLE 4

| | | | Prepreg No. | PP21 | PP22-1 | PP22-2 | PP22-3 | PP22-4 | PP22-5 | PP22-6 | PP22-7 | PP23-1 | PP23-2 |
|---|---|---|---|---|---|---|---|---|---|---|---|---|---|
| Epoxy resin composition | Formulation (part by mass) | Epoxy resin component | Bisphenol A type epoxy resin (equivalent: 190 g/eq) | 60 | | | | 40 | | | | 20 | |
| | | | Bisphenol A type epoxy resin (equivalent: 1975 g/eq) | — | | | | — | | | | — | |
| | | | Bisphenol F type epoxy resin (equivalent: 165 g/eq) | — | | | | — | | | | — | |
| | | | Bisphenol F type epoxy resin (equivalent: 1070 g/eq) | 21 | | | | 41 | | | | 61 | |
| | | | Phenolic novolac type epoxy resin (equivalent: 180 g/eq) | 7 | | | | 7 | | | | 7 | |
| | | Thermoplastic resin | Polyvinyl formal | 4 | | | | 4 | | | | 4 | |
| | | Curing agent | Dicyandiamide | 5.2 | | | | 5.2 | | | | 5.2 | |
| | | Curing/accelerator | Urea derivative | 2.6 | | | | 2.6 | | | | 2.6 | |
| | Epoxy equivalent of entire epoxy resin component (g/eq) | | | 235.1 | | | | 305.8 | | | | 437.5 | |
| | Bisphenol A type/Bisphenol F type mass ratio | | | 2.86 | | | | 0.98 | | | | 0.33 | |
| | Novolac type epoxy resin content (mass %) | | | 8.0 | | | | 8.0 | | | | 8.0 | |
| | Polyvinyl formal content with respect to 100 parts by mass of epoxy resin component (part by mass) | | | 4.5 | | | | 4.5 | | | | 4.5 | |
| | Dicyandiamide content (g/epoxy 1 mol) | | | 13.9 | | | | 18.1 | | | | 25.8 | |
| | Dicyandiamide/Urea derivative mass ratio | | | 2.0 | | | | 2.0 | | | | 2.0 | |
| | MEK swelling ratio (mass %) | | | 26.5 | | | | 32.5 | | | | 37.2 | |
| | Tensile strength (MPa) | | | 120 | | | | 100 | | | | 75 | |
| | Breakage elongation (%) | | | 10 | | | | 13 | | | | 15 | |
| | Tensile property (MPa · %) | | | 480 | | | | 500 | | | | 420 | |
| Reinforcing fiber | Type | | | T800SC | T800SC | M40JB | XN-15 | T700SC | M50JB | YSH-60A | YS-80A | T800SC | M40JB |
| | Tensile modulus (tf/mm$^2$) | | | 30 | 30 | 40 | 15 | 24 | 50 | 60 | 80 | 30 | 40 |
| Prepreg | Density (g/cm$^3$) | | | 1.59 | 1.59 | 1.48 | 1.72 | 1.67 | 1.48 | 1.50 | 1.46 | 1.59 | 1.48 |
| | Resin content (mass %) | | | 30 | 30 | 45 | 16 | 17 | 53 | 58 | 65 | 30 | 45 |
| | Tackiness (N) | | | 9.1 | 7.5 | 7.8 | 7.1 | 7.2 | 7.9 | 8.0 | 8.0 | 2.6 | 2.9 |
| | Drapability | | | ○ | ○ | ○ | ○ | ○ | ○ | ○ | ○ | X | X |
| | Fiber-reinforced epoxy resin material tensile strength (MPa) | | | 52 | 55 | 53 | 57 | 58 | 53 | 51 | 49 | 49 | 47 |

TABLE 5

| | | | | PP24-1 | PP24-2 | PP25-1 | PP25-2 | PP25-3 | PP25-4 | PP25-5 | PP25-6 | PP25-7 |
|---|---|---|---|---|---|---|---|---|---|---|---|---|
| Epoxy resin composition | Formulation (part by mass) | Epoxy resin component | Bisphenol A type epoxy resin (equivalent: 190 g/eq) | — | | | | | — | | | |
| | | | Bisphenol A type epoxy resin (equivalent: 1975 g/eq) | 60 | | | | | 40 | | | |
| | | | Bisphenol F type epoxy resin (equivalent: 165 g/eq) | 21 | | | | | 41 | | | |
| | | | Bisphenol F type epoxy resin (equivalent: 1070 g/eq) | — | | | | | — | | | |
| | | | Phenolic novolac type epoxy resin (equivalent: 180 g/eq) | 7 | | | | | 7 | | | |
| | | Thermoplastic resin | Polyvinyl formal | 4 | | | | | 4 | | | |
| | | Curing agent | Dicyandiamide | 5.2 | | | | | 5.2 | | | |
| | | Curing/accelerator | Urea derivative | 2.6 | | | | | 2.6 | | | |
| | Epoxy equivalent of entire epoxy resin component (g/eq) | | | 447.7 | | | | | 286.1 | | | |
| | Bisphenol A type/Bisphenol F type mass ratio | | | 2.86 | | | | | 0.98 | | | |
| | Novolac type epoxy resin content (mass %) | | | 8.0 | | | | | 8.0 | | | |
| | Polyvinyl formal content with respect to 100 parts by mass of epoxy resin component (part by mass) | | | 4.5 | | | | | 4.5 | | | |
| | Dicyandiamide content (g/epoxy 1 mol) | | | 26.5 | | | | | 16.9 | | | |
| | Dicyandiamide/Urea derivative mass ratio | | | 2.0 | | | | | 2.0 | | | |
| | MEK swelling ratio (mass %) | | | 38.1 | | | | | 30.5 | | | |
| | Tensile strength (MPa) | | | 85 | | | | | 110 | | | |
| | Breakage elongation (%) | | | 13 | | | | | 11 | | | |
| | Tensile property (MPa · %) | | | 450 | | | | | 500 | | | |
| Reinforcing fiber | Type | | | T800SC | M40JB | T800SC | M40JB | XN-15 | T700SC | M50JB | YSH-60A | YS-80A |
| | Tensile modulus (tf/mm$^2$) | | | 30 | 40 | 30 | 40 | 15 | 24 | 50 | 60 | 80 |
| Prepreg | Density (g/cm$^3$) | | | 1.59 | 1.48 | 1.59 | 1.48 | 1.75 | 1.67 | 1.48 | 1.50 | 1.46 |
| | Resin content (mass %) | | | 30 | 45 | 30 | 45 | 16 | 17 | 53 | 58 | 65 |
| | Tackiness (N) | | | 2.1 | 2.2 | 7.3 | 7.6 | 6.9 | 7.0 | 7.7 | 7.8 | 7.8 |
| | Drapability | | | X | X | ○ | ○ | ○ | ○ | ○ | ○ | ○ |
| | Fiber-reinforced epoxy resin material tensile strength (MPa) | | | 48 | 46 | 54 | 52 | 56 | 57 | 52 | 50 | 48 |

TABLE 6

| | | | | PP26 | PP27-1 | PP27-2 | PP27-3 | PP27-4 | PP27-5 | PP27-6 | PP27-7 | PP28 |
|---|---|---|---|---|---|---|---|---|---|---|---|---|
| Epoxy resin composition | Formulation (part by mass) | Epoxy resin component | Bisphenol A type epoxy resin (equivalent: 190 g/eq) | — | | | | 40 | | | | 40 |
| | | | Bisphenol A type epoxy resin (equivalent: 1975 g/eq) | 20 | | | | — | | | | — |
| | | | Bisphenol F type epoxy resin (equivalent: 165 g/eq) | 61 | | | | 10 | | | | — |
| | | | Bisphenol F type epoxy resin (equivalent: 1070 g/eq) | — | | | | 31 | | | | 41 |

TABLE 6-continued

| | | Prepreg No. | PP26 | PP27-1 | PP27-2 | PP27-3 | PP27-4 | PP27-5 | PP27-6 | PP27-7 | PP28 |
|---|---|---|---|---|---|---|---|---|---|---|---|
| | | Phenolic novolac type epoxy resin (equivalent: 180 g/eq) | 7 | | | | 7 | | | | — |
| | Thermoplastic resin | Polyvinyl formal | 4 | | | | 4 | | | | 4 |
| | Curing agent | Dicyandiamide | 5.2 | | | | 5.2 | | | | 4.5 |
| | Curing accelerator | Urea derivative | 2.6 | | | | 2.6 | | | | 2.3 |
| | Epoxy equivalent of entire epoxy resin component (g/eq) | | 210.2 | | | | 259.6 | | | | 325.5 |
| | Bisphenol A type/Bisphenol F type mass ratio | | 0.33 | | | | 0.98 | | | | 0.98 |
| | Novolac type epoxy resin content (mass %) | | 8.0 | | | | 8.0 | | | | — |
| | Polyvinyl formal content with respect to 100 parts by mass of epoxy resin component (part by mass) | | 4.5 | | | | 4.5 | | | | 4.9 |
| | Dicyandiamide content (g/epoxy 1 mol) | | 12.4 | | | | 15.3 | | | | 18.2 |
| | Dicyandiamide/Urea derivative mass ratio | | 2.0 | | | | 2.0 | | | | 2.0 |
| | MEK swelling ratio (mass %) | | 23.1 | | | | 30.1 | | | | 45.6 |
| | Tensile strength (MPa) | | 115 | | | | 120 | | | | 70 |
| | Breakage elongation (%) | | 10 | | | | 12 | | | | 19 |
| | Tensile property (MPa · %) | | 500 | | | | 550 | | | | 520 |
| Reinforcing fiber | Type | | T800SC | T800SC | M40JB | XN-15 | T700SC | M50JB | YSH-60A | YS-80A | T800SC |
| | Tensile modulus (tf/mm$^2$) | | 30 | 30 | 40 | 15 | 24 | 50 | 60 | 80 | 30 |
| Prepreg | Density (g/cm$^3$) | | 1.59 | 1.59 | 1.48 | 1.72 | 1.67 | 1.48 | 1.50 | 1.46 | 1.59 |
| | Resin content (mass %) | | 30 | 30 | 45 | 16 | 17 | 53 | 58 | 65 | 30 |
| | Tackiness (N) | | 8.5 | 8.3 | 8.6 | 7.9 | 8.0 | 8.7 | 8.9 | 8.9 | 6.2 |
| | Drapability | | ○ | ○ | ○ | ○ | ○ | ○ | ○ | ○ | ○ |
| | Fiber-reinforced epoxy resin material tensile strength (MPa) | | 51 | 54 | 52 | 56 | 57 | 52 | 50 | 48 | 27 |

TABLE 7

| | | | Prepreg No. | PP29 | PP30 | PP31-1 | PP31-2 | PP32 | PP33 | PP34-1 | PP34-2 | PP35 |
|---|---|---|---|---|---|---|---|---|---|---|---|---|
| Epoxy resin composition | Formulation (part by mass) | Epoxy resin component | Bisphenol A type epoxy resin (equivalent: 190 g/eq) | 40 | 40 | 40 | | 40 | 40 | 40 | | 81 |
| | | | Bisphenol A type epoxy resin (equivalent: 1975 g/eq) | — | — | — | | — | — | — | | — |
| | | | Bisphenol F type epoxy resin (equivalent: 165 g/eq) | — | — | — | | — | — | — | | — |
| | | | Bisphenol F type epoxy resin (equivalent: 1070 g/eq) | 41 | 41 | 41 | | 41 | 41 | 41 | | — |
| | | | Phenolic novolac type epoxy resin (equivalent: 180 g/eq) | 2 | 4 | 10 | | 13 | 18 | 20 | | 7 |
| | Thermoplastic resin | Polyvinyl formal | | 4 | 4 | 4 | | 4 | 4 | 4 | | 4 |
| | Curing agent | Dicyandiamide | | 4.7 | 4.9 | 5.5 | | 5.8 | 6.3 | 6.5 | | 5.2 |
| | Curing accelerator | Urea derivative | | 2.4 | 2.5 | 2.8 | | 2.9 | 3.2 | 3.3 | | 2.6 |
| | Epoxy equivalent of entire epoxy resin component (g/eq) | | | 319.3 | 313.6 | 298.9 | | 292.8 | 283.8 | 280.6 | | 189.2 |
| | Bisphenol A type/Bisphenol F type mass ratio | | | 0.98 | 0.98 | 0.98 | | 0.98 | 0.98 | 0.98 | | — |
| | Novolac type epoxy resin content (mass %) | | | 2.4 | 4.7 | 11.0 | | 13.8 | 18.2 | 19.8 | | — |

TABLE 7-continued

| | Prepreg No. | PP29 | PP30 | PP31-1 | PP31-2 | PP32 | PP33 | PP34-1 | PP34-2 | PP35 |
|---|---|---|---|---|---|---|---|---|---|---|
| | Polyvinyl formal content with respect to 100 parts by mass of epoxy resin component (part by mass) | 4.8 | 4.7 | 4.4 | 4.4 | 4.3 | 4.0 | 4.0 | 4.0 | 4.5 |
| | Dicyandiamide content (g/epoxy 1 mol) | 18.2 | 18.2 | 18.2 | 18.2 | 18.2 | 18.2 | 18.2 | 18.2 | 11.2 |
| | Dicyandiamide/Urea derivative mass ratio | 2.0 | 2.0 | 2.0 | 2.0 | 2.0 | 2.0 | 2.0 | 2.0 | 2.0 |
| | MEK swelling ratio (mass %) | 42.5 | 37.1 | 27.3 | 27.3 | 23.6 | 19.6 | 13.2 | 13.2 | 13.1 |
| | Tensile strength (MPa) | 85 | 95 | 110 | 110 | 130 | 145 | 150 | 150 | 130 |
| | Breakage elongation (%) | 17 | 16 | 12 | 12 | 10 | 7 | 6 | 6 | 6 |
| | Tensile property (MPa · %) | 550 | 550 | 550 | 550 | 550 | 500 | 450 | 450 | 330 |
| Reinforcing fiber | Type | T800SC | T800SC | T800SC | M40JB | T800SC | T800SC | T800SC | M40JB | T800SC |
| | Tensile modulus (tf/mm²) | 30 | 30 | 30 | 40 | 30 | 30 | 30 | 40 | 30 |
| Prepreg | Density (g/cm³) | 1.59 | 1.59 | 1.59 | 1.48 | 1.59 | 1.59 | 1.59 | 1.48 | 1.59 |
| | Resin content (mass %) | 30 | 30 | 30 | 45 | 30 | 30 | 30 | 45 | 30 |
| | Tackiness (N) | 6.8 | 7.2 | 7.8 | 7.9 | 8.0 | 8.5 | 8.6 | 8.8 | 3.1 |
| | Drapability | ○ | ○ | ○ | ○ | ○ | X | X | X | ○ |
| | Fiber-reinforced epoxy resin material tensile strength (MPa) | 40 | 50 | 56 | 55 | 49 | 40 | 22 | 21 | — |

The materials used in Tables 1 to 7 are as follows.

Bisphenol A type epoxy resin (epoxy equivalent: 190 g/eq): jER828EL (liquid state at normal temperature, viscosity (25° C.): 120-150 P, weight average molecular weight: 400) manufactured by Mitsubishi Chemical Corporation Bisphenol A type epoxy resin (epoxy equivalent: 1975 g/eq): jER1007 (solid state at normal temperature) manufactured by Mitsubishi Chemical Corporation Bisphenol F type epoxy resin (epoxy equivalent: 165 g/eq): jER806 (liquid state at normal temperature, viscosity (25° C.): 15-25 P, weight average molecular weight: 340) manufactured by Mitsubishi Chemical Corporation Bisphenol F type epoxy resin (epoxy equivalent: 1070 g/eq): jER4005P (solid state at normal temperature, weight average molecular weight: 7200) manufactured by Mitsubishi Chemical Corporation Phenolic novolac type epoxy resin (epoxy equivalent: 180 g/eq): jER154 (epoxy groups number per one molecule: 3 or more) manufactured by Mitsubishi Chemical Corporation Phenoxy type epoxy resin (epoxy equivalent: 8000 g/eq): jER1256 (weight average molecular weight: 50000) manufactured by Mitsubishi Chemical Corporation Polyvinyl formal: Vinylec (registered trademark) E manufactured by JNC Corporation Dicyandiamide: DICY7 manufactured by Mitsubishi Chemical Corporation Urea derivative: DCMU-99 (3-(3,4-dichlorophenyl)-1,1-dimethylurea) manufactured by Hodogaya Chemical Co., Ltd.

T700SC: Torayca (registered trademark) T700SC (tensile modulus: 24 tf/mm² (235 GPa)), which is a carbon fiber manufactured by Toray Industries Inc.

T800SC: Torayca T800SC (tensile modulus: 30 tf/mm² (294 GPa)), which is a carbon fiber manufactured by Toray Industries Inc.

M40JB: Torayca M40JB (tensile modulus: 40 tf/mm² (392 GPa)), which is a carbon fiber manufactured by Toray Industries Inc.

M50JB: Torayca M50JB (tensile modulus: 50 tf/mm² (490 GPa)), which is a carbon fiber manufactured by Toray Industries Inc.

XN-15: GRANOC XN-15 (tensile modulus: 15 tf/mm² (147 GPa)), which is a carbon fiber manufactured by Nippon Graphite Fiber Corporation YSH-60A: GRANOC YSH-60A (tensile modulus: 63 tf/mm² (618 GPa)), which is a carbon fiber manufactured by Nippon Graphite Fiber Corporation YSH-80A: GRANOC YSH-80A (tensile modulus: 80 tf/mm² (785 GPa)), which is a carbon fiber manufactured by Nippon Graphite Fiber Corporation From Tables 4 to 7, it can be seen that prepregs No. PP21, PP22, PP25-PP27 and PP29-PP32, in which an epoxy resin composition, that comprises a novolac type epoxy resin, a bisphenol A type epoxy resin and a bisphenol F type epoxy resin in a specified amount and a cured product thereof has a swelling ratio in a range from 20 mass % to 44 mass % in methyl ethyl ketone, was used, exhibit good tackiness and drapability. In addition, it can be seen that fiber-reinforced epoxy resin materials composed of these prepregs exhibit high tensile strength.

For prepreg No. PP28, the cured product has an excessively high swelling ratio of 45.6 mass % in methyl ethyl ketone, thus the fiber-reinforced epoxy resin material exhibits inferior tensile strength. For prepregs No. PP33 and PP34, the cured products have excessively low swelling ratios of 19.6 mass % and 13.2 mass % in methyl ethyl ketone, respectively, thus prepregs No. PP33 and PP34 exhibit inferior drapability. For prepreg No. PP35, the cured product has an excessively low swelling ratio of 13.1 mass % in methyl ethyl ketone, thus the test piece thereof for tensile test was unable to be produced.

[Production of Tubular Body Made of Fiber-Reinforced Epoxy Resin Material]

Figure 3:
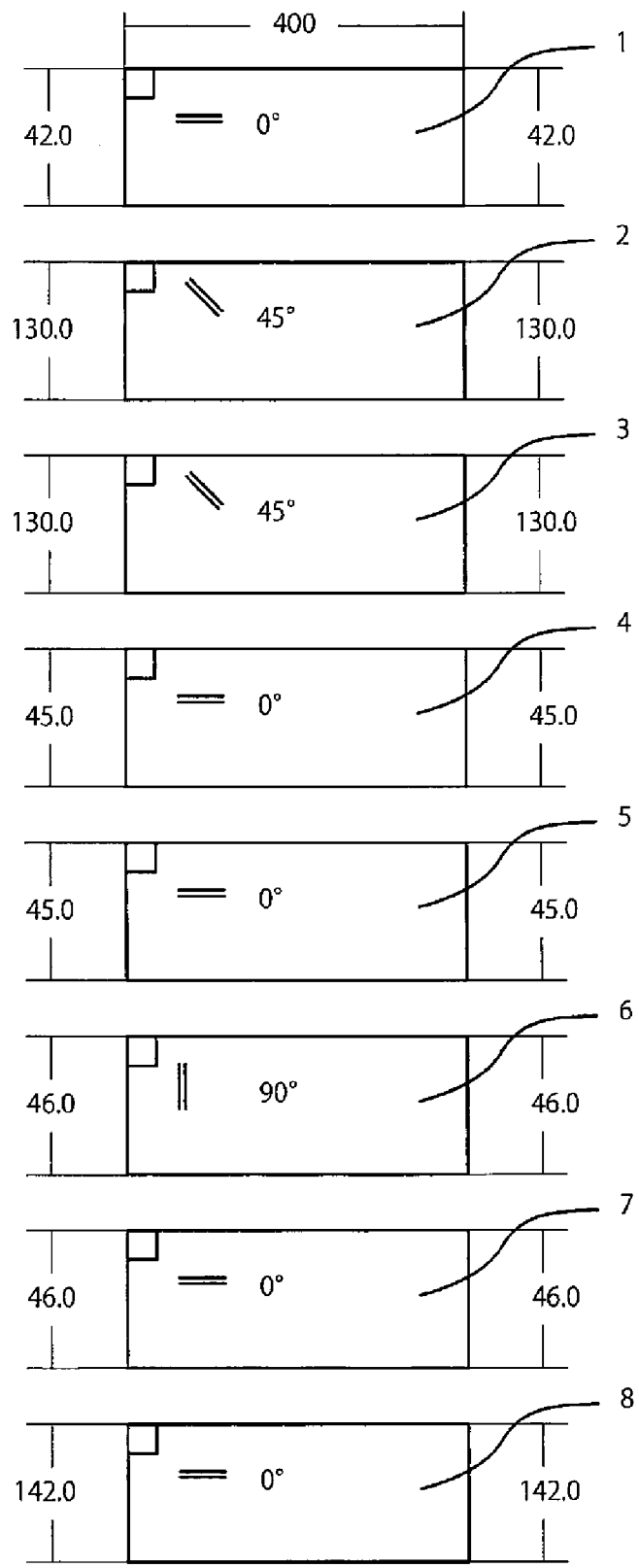
FIG. 3 is a drawing showing a laminated construction of fiber-reinforced prepregs constituting a tubular body made of a fiber-reinforced epoxy resin material.
Figure 4:
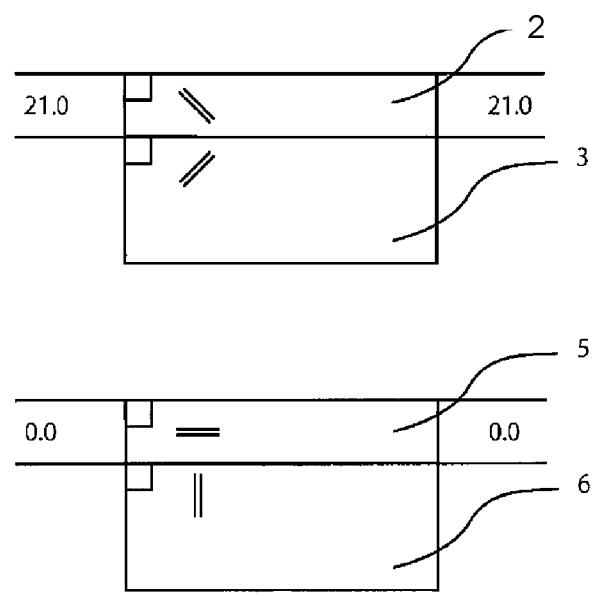
FIG. 4 is an explanatory drawing illustrating an embodiment for laminating prepregs.

Tubular bodies made of a fiber-reinforced epoxy resin material were produced by a sheet winding method. Specifically, as shown in FIG. 3, prepregs 1 to 8 were wound around a core roller (mandrel) in order. Prepreg 1 forms the innermost layer, and the prepreg 8 forms the outermost layer. Prepregs 1, 4, 5, 7, and 8 are straight prepregs whose reinforcing fibers are arranged parallel to the axis of the tubular body. Prepregs 2 and 3 are bias prepregs whose reinforcing fibers are arranged so as to be tilted relative to the axis of the tubular body. Prepreg 6 is a hoop prepreg whose reinforcing fiber is arranged perpendicularly to the axis of the tubular body. As shown in FIG. 4, prepreg 2 and prepreg 3, and prepreg 5 and prepreg 6 were attached to each other such that the tilt directions of the reinforcing fibers thereof intersect each other. It is noted that prepregs shown in Tables 8-18 were used as prepregs 1-8. A tape was wound around the outer peripheral surface of the obtained wound body and heated to cause a curing reaction. The winding conditions and the curing conditions are shown below. In FIGS. 3 and 4, the dimensions are indicated by the unit of mm.

Winding Conditions:
Rolling speed: 34 Hz
Tape: PT-30H manufactured by Shin-Etsu Chemical Co., Ltd., tension 6000±100 gf
Pitch: 2.0 mm
Main shaft rotational speed: 1870 Hz to 1890 Hz Curing Conditions:
(1) Elevating the temperature from normal temperature to 80° C. in 30 minutes,
(2) Keeping at 80° C.±5° C. for 30 minutes±5 minutes,
(3) Elevating the temperature from 80° C. to 130° C. in 30 minutes, and
(4) Keeping at 130° C.±5° C. for 120 minutes±5 minutes.

TABLE 8

| Tubular body No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Prepreg 1 | Type | PP1 | PP2 | PP3 | PP4 | PP5-1 | PP6 | PP7-1 | PP8 | PP9 | PP10 | PP11 | PP12-1 | PP13-1 |
| | Density (g/cm³) | 1.59 | 1.59 | 1.59 | 1.59 | 1.59 | 1.59 | 1.59 | 1.59 | 1.59 | 1.59 | 1.59 | 1.59 | 1.59 |
| | Reinforcing fiber tensile modulus (tf/mm²) | 30 | 30 | 30 | 30 | 30 | 30 | 30 | 30 | 30 | 30 | 30 | 30 | 30 |
| Prepreg 2 | Type | PP1 | PP2 | PP3 | PP4 | PP5-1 | PP6 | PP7-1 | PP8 | PP9 | PP10 | PP11 | PP12-1 | PP13-1 |
| Prepreg 3 | Type | PP1 | PP2 | PP3 | PP4 | PP5-1 | PP6 | PP7-1 | PP8 | PP9 | PP10 | PP11 | PP12-1 | PP13-1 |
| Prepreg 4 | Type | PP1 | PP2 | PP3 | PP4 | PP5-1 | PP6 | PP7-1 | PP8 | PP9 | PP10 | PP11 | PP12-1 | PP13-1 |
| Prepreg 5 | Type | PP1 | PP2 | PP3 | PP4 | PP5-1 | PP6 | PP7-1 | PP8 | PP9 | PP10 | PP11 | PP12-1 | PP13-1 |
| Prepreg 6 | Type | P805S-3 | P805S-3 | P805S-3 | P805S-3 | P805S-3 | P805S-3 | P805S-3 | P805S-3 | P805S-3 | P805S-3 | P805S-3 | P805S-3 | P805S-3 |
| Prepreg 7 | Type | PP1 | PP2 | PP3 | PP4 | PP5-1 | PP6 | PP7-1 | PP8 | PP9 | PP10 | PP11 | PP12-1 | PP13-1 |
| Prepreg 8 | Type | PP1 | PP2 | PP3 | PP4 | PP5-1 | PP6 | PP7-1 | PP8 | PP9 | PP10 | PP11 | PP12-1 | PP13-1 |
| | Density (g/cm³) | 1.59 | 1.59 | 1.59 | 1.59 | 1.59 | 1.59 | 1.59 | 1.59 | 1.59 | 1.59 | 1.59 | 1.59 | 1.59 |
| | Reinforcing fiber tensile modulus (tf/mm²) | 30 | 30 | 30 | 30 | 30 | 30 | 30 | 30 | 30 | 30 | 30 | 30 | 30 |
| Three point bending strength (N) | | 2390 | 2410 | 2520 | 2550 | 2560 | 2500 | 2390 | 2130 | 2020 | 2230 | 2400 | 2480 | 2360 |
| Weight (g) | | 34.0 | 34.0 | 34.0 | 34.0 | 34.0 | 34.0 | 34.0 | 34.0 | 34.0 | 34.0 | 34.0 | 34.0 | 34.0 |

TABLE 9

| Tubular body No. | | 14 | 15 | 16 | 17 | 18 | 19 |
|---|---|---|---|---|---|---|---|
| Prepreg 1 | Type | PP5-1 | PP1 | PP5-2 | PP7-2 | PP12-2 | PP13-2 |
| | Density (g/cm³) | 1.59 | 1.59 | 1.48 | 1.48 | 1.48 | 1.48 |
| | Reinforcing fiber tensile modulus (tf/mm²) | 30 | 30 | 40 | 40 | 40 | 40 |
| Prepreg 2 | Type | PP5-1 | PP1 | PP5-2 | PP7-2 | PP12-2 | PP13-2 |
| Prepreg 3 | Type | PP5-1 | PP1 | PP5-2 | PP7-2 | PP12-2 | PP13-2 |
| Prepreg 4 | Type | PP5-1 | PP1 | PP5-2 | PP7-2 | PP12-2 | PP13-2 |
| Prepreg 5 | Type | PP5-1 | PP1 | PP5-2 | PP7-2 | PP12-2 | PP13-2 |
| Prepreg 6 | Type | P805S-3 | P805S-3 | P805S-3 | P805S-3 | P805S-3 | P805S-3 |
| Prepreg 7 | Type | PP1 | PP5-1 | PP5-2 | PP7-2 | PP12-2 | PP13-2 |
| Prepreg 8 | Type | PP1 | PP5-1 | PP5-2 | PP7-2 | PP12-2 | PP13-2 |
| | Density (g/cm³) | 1.59 | 1.59 | 1.48 | 1.48 | 1.48 | 1.48 |
| | Reinforcing fiber tensile modulus (tf/mm²) | 30 | 30 | 40 | 40 | 40 | 40 |
| Three point bending strength (N) | | 2450 | 2530 | 2130 | 2000 | 2070 | 1970 |
| Weight (g) | | 34.0 | 34.0 | 31.7 | 31.7 | 31.7 | 31.7 |

TABLE 10

| Tubular body No. | | 20 | 21 | 22 | 23 | 24 | 25 | 26 | 27 | 28 |
|---|---|---|---|---|---|---|---|---|---|---|
| Prepreg 1 | Type | PP5-2 | PP5-2 | PP5-2 | PP5-2 | PP5-2 | PP5-2 | PP5-2 | PP5-2 | PP5-2 |
| | Density (g/cm³) | 1.48 | 1.48 | 1.48 | 1.48 | 1.48 | 1.48 | 1.48 | 1.48 | 1.48 |

TABLE 10-continued

| Tubular body No. | | 20 | 21 | 22 | 23 | 24 | 25 | 26 | 27 | 28 |
|---|---|---|---|---|---|---|---|---|---|---|
| | Reinforcing fiber tensile modulus (tf/mm$^2$) | 40 | 40 | 40 | 40 | 40 | 40 | 40 | 40 | 40 |
| Prepreg 2 | Type | PP5-2 | PP5-2 | PP5-2 | PP5-2 | PP5-2 | PP5-2 | PP5-2 | PP5-2 | PP5-2 |
| Prepreg 3 | Type | PP5-2 | PP5-2 | PP5-2 | PP5-2 | PP5-2 | PP5-2 | PP5-2 | PP5-2 | PP5-2 |
| Prepreg 4 | Type | PP5-2 | PP5-2 | PP5-2 | PP5-2 | PP5-2 | PP5-2 | PP5-2 | PP5-2 | PP5-2 |
| Prepreg 5 | Type | PP5-2 | PP5-2 | PP5-2 | PP5-2 | PP5-2 | PP5-2 | PP5-2 | PP5-2 | PP5-2 |
| Prepreg 6 | Type | P805S-3 | P805S-3 | P805S-3 | P805S-3 | P805S-3 | P805S-3 | P805S-3 | P805S-3 | P805S-3 |
| Prepreg 7 | Type | PP1 | PP3 | PP4 | PP5-1 | PP7-1 | PP10 | PP11 | PP12-1 | PP13-1 |
| Prepreg 8 | Type | PP1 | PP3 | PP4 | PP5-1 | PP7-1 | PP10 | PP11 | PP12-1 | PP13-1 |
| | Density (g/cm$^3$) | 1.59 | 1.59 | 1.59 | 1.59 | 1.59 | 1.59 | 1.59 | 1.59 | 1.59 |
| | Reinforcing fiber tensile modulus (tf/mm$^2$) | 30 | 30 | 30 | 30 | 30 | 30 | 30 | 30 | 30 |
| Three point bending strength (N) | | 2210 | 2370 | 2410 | 2430 | 2200 | 2160 | 2340 | 2400 | 2200 |
| Weight (g) | | 32.4 | 32.4 | 32.4 | 32.4 | 32.4 | 32.4 | 32.4 | 32.4 | 32.4 |

TABLE 11

| Tubular body No. | | 29 | 30 | 31 | 32 | 33 | 34 | 35 | 36 | 37 |
|---|---|---|---|---|---|---|---|---|---|---|
| Prepreg 1 | Type | PP7-2 | PP7-2 | PP7-2 | PP7-2 | PP12-2 | PP12-2 | PP13-2 | PP13-2 | PP1 |
| | Density (g/cm$^3$) | 1.48 | 1.48 | 1.48 | 1.48 | 1.48 | 1.48 | 1.48 | 1.48 | 1.59 |
| | Reinforcing fiber tensile modulus (tf/mm$^2$) | 40 | 40 | 40 | 40 | 40 | 40 | 40 | 40 | 30 |
| Prepreg 2 | Type | PP7-2 | PP7-2 | PP7-2 | PP7-2 | PP12-2 | PP12-2 | PP13-2 | PP13-2 | PP1 |
| Prepreg 3 | Type | PP7-2 | PP7-2 | PP7-2 | PP7-2 | PP12-2 | PP12-2 | PP13-2 | PP13-2 | PP1 |
| Prepreg 4 | Type | PP7-2 | PP7-2 | PP7-2 | PP7-2 | PP12-2 | PP12-2 | PP13-2 | PP13-2 | PP1 |
| Prepreg 5 | Type | PP7-2 | PP7-2 | PP7-2 | PP7-2 | PP12-2 | PP12-2 | PP13-2 | PP13-2 | PP1 |
| Prepreg 6 | Type | P805S-3 | P805S-3 | P805S-3 | P805S-3 | P805S-3 | P805S-3 | P805S-3 | P805S-3 | P8053-3 |
| Prepreg 7 | Type | PP1 | PP5-1 | PP10 | PP12-1 | PP1 | PP5-1 | PP1 | PP5-1 | PP5-2 |
| Prepreg 8 | Type | PP1 | PP5-1 | PP10 | PP12-1 | PP1 | PP5-1 | PP1 | PP5-1 | PP5-2 |
| | Density (g/cm$^3$) | 1.59 | 1.59 | 1.59 | 1.59 | 1.59 | 1.59 | 1.59 | 1.59 | 1.48 |
| | Reinforcing fiber tensile modulus (tf/mm$^2$) | 30 | 30 | 30 | 30 | 30 | 30 | 30 | 30 | 40 |
| Three point bending strength (N) | | 2100 | 2400 | 2060 | 2370 | 2160 | 2340 | 2090 | 2310 | 2410 |
| Weight (g) | | 32.4 | 32.4 | 32.4 | 32.4 | 32.4 | 32.4 | 32.4 | 32.4 | 33.3 |

TABLE 12

| Tubular body No. | | 38 | 39 | 40 | 41 | 42 | 43 | 44 | 45 | 46 | 47 |
|---|---|---|---|---|---|---|---|---|---|---|---|
| Prepreg 1 | Type | PP5-5 | PP12-5 | PP5-6 | PP12-6 | PP5-7 | PP12-7 | PP5-2 | PP5-2 | PP5-2 | PP5-2 |
| | Density (g/cm$^3$) | 1.48 | 1.48 | 1.50 | 1.50 | 1.46 | 1.46 | 1.48 | 1.48 | 1.48 | 1.48 |
| | Reinforcing fiber tensile modulus (tf/mm$^2$) | 50 | 50 | 60 | 60 | 80 | 80 | 40 | 40 | 40 | 40 |
| Prepreg 2 | Type | PP5-5 | PP12-5 | PP5-6 | PP12-6 | PP5-7 | PP12-7 | PP5-2 | PP5-2 | PP5-2 | PP5-2 |
| Prepreg 3 | Type | PP5-5 | PP12-5 | PP5-6 | PP12-6 | PP5-7 | PP12-7 | PP5-2 | PP5-2 | PP5-2 | PP5-2 |
| Prepreg 4 | Type | PP5-5 | PP12-5 | PP5-6 | PP12-6 | PP5-7 | PP12-7 | PP5-2 | PP5-2 | PP5-2 | PP5-2 |
| Prepreg 5 | Type | PP5-5 | PP12-5 | PP5-6 | PP12-6 | PP5-7 | PP12-7 | PP5-2 | PP5-2 | PP5-2 | PP5-2 |
| Prepreg 6 | Type | P805S-3 | P805S-3 | P805S-3 | P805S-3 | P805S-3 | P805S-3 | P805S-3 | P805S-3 | P805S-3 | P805S-3 |
| Prepreg 7 | Type | PP5-1 | PP5-1 | PP5-1 | PP5-1 | PP5-1 | PP5-1 | PP5-4 | PP12-4 | PP5-3 | PP12-3 |
| Prepreg 8 | Type | PP5-1 | PP5-1 | PP5-1 | PP5-1 | PP5-1 | PP5-1 | PP5-4 | PP12-4 | PP5-3 | PP12-3 |
| | Density (g/cm$^3$) | 1.59 | 1.59 | 1.59 | 1.59 | 1.59 | 1.59 | 1.67 | 1.67 | 1.72 | 1.72 |
| | Reinforcing fiber tensile modulus (tf/mm$^2$) | 30 | 30 | 30 | 30 | 30 | 30 | 24 | 24 | 15 | 15 |

TABLE 12-continued

| Tubular body No. | 38 | 39 | 40 | 41 | 42 | 43 | 44 | 45 | 46 | 47 |
|---|---|---|---|---|---|---|---|---|---|---|
| Three point bending strength (N) | 2300 | 2280 | 2230 | 2190 | 2030 | 2010 | 2470 | 2430 | 2520 | 2490 |
| Weight (g) | 32.5 | 32.5 | 32.8 | 32.8 | 32.1 | 32.1 | 33.0 | 33.0 | 40.1 | 40.1 |

TABLE 13

| Tubular body No. | | 48 | 49 | 50 | 51 | 52 | 53 | 54 | 55 |
|---|---|---|---|---|---|---|---|---|---|
| Prepreg 1 | Type | PP21 | PP22-1 | PP23-1 | PP24-1 | PP25-1 | PP26 | PP27-1 | PP28 |
| | Density (g/cm³) | 1.59 | 1.59 | 1.59 | 1.59 | 1.59 | 1.59 | 1.59 | 1.59 |
| | Reinforcing fiber tensile modulus (tf/mm²) | 30 | 30 | 30 | 30 | 30 | 30 | 30 | 30 |
| Prepreg 2 | Type | PP21 | PP22-1 | PP23-1 | PP24-1 | PP25-1 | PP26 | PP27-1 | PP28 |
| Prepreg 3 | Type | PP21 | PP22-1 | PP23-1 | PP24-1 | PP25-1 | PP26 | PP27-1 | PP28 |
| Prepreg 4 | Type | PP21 | PP22-1 | PP23-1 | PP24-1 | PP25-1 | PP26 | PP27-1 | PP28 |
| Prepreg 5 | Type | PP21 | PP22-1 | PP23-1 | PP24-1 | PP25-1 | PP26 | PP27-1 | PP28 |
| Prepreg 6 | Type | P805S-3 | P805S-3 | P805S-3 | P805S-3 | P805S-3 | P805S-3 | P805S-3 | P805S-3 |
| Prepreg 7 | Type | PP21 | PP22-1 | PP23-1 | PP24-1 | PP25-1 | PP26 | PP27-1 | PP28 |
| Prepreg 8 | Type | PP21 | PP22-1 | PP23-1 | PP24-1 | PP25-1 | PP26 | PP27-1 | PP28 |
| | Density (g/cm³) | 1.59 | 1.59 | 1.59 | 1.59 | 1.59 | 1.59 | 1.59 | 1.59 |
| | Reinforcing fiber tensile modulus (tf/mm²) | 30 | 30 | 30 | 30 | 30 | 30 | 30 | 30 |
| Three point bending strength (N) | | 2200 | 2390 | 2150 | 2130 | 2250 | 2200 | 2300 | 1930 |
| Weight (g) | | 34.0 | 34.0 | 34.0 | 34.0 | 34.0 | 34.0 | 34.0 | 34.0 |

| Tubular body No. | | 56 | 57 | 58 | 59 | 60 | 61 |
|---|---|---|---|---|---|---|---|
| Prepreg 1 | Type | PP29 | PP30 | PP31-1 | PP32 | PP33 | PP34-1 |
| | Density (g/cm³) | 1.59 | 1.59 | 1.59 | 1.59 | 1.59 | 1.59 |
| | Reinforcing fiber tensile modulus (tf/mm²) | 30 | 30 | 30 | 30 | 30 | 30 |
| Prepreg 2 | Type | PP29 | PP30 | PP31-1 | PP32 | PP33 | PP34-1 |
| Prepreg 3 | Type | PP29 | PP30 | PP31-1 | PP32 | PP33 | PP34-1 |
| Prepreg 4 | Type | PP29 | PP30 | PP31-1 | PP32 | PP33 | PP34-1 |
| Prepreg 5 | Type | PP29 | PP30 | PP31-1 | PP32 | PP33 | PP34-1 |
| Prepreg 6 | Type | P805S-3 | P805S-3 | P805S-3 | P805S-3 | P805S-3 | P805S-3 |
| Prepreg 7 | Type | PP29 | PP30 | PP31-1 | PP32 | PP33 | PP34-1 |
| Prepreg 8 | Type | PP29 | PP30 | PP31-1 | PP32 | PP33 | PP34-1 |
| | Density (g/cm³) | 1.59 | 1.59 | 1.59 | 1.59 | 1.59 | 1.59 |
| | Reinforcing fiber tensile modulus (tf/mm²) | 30 | 30 | 30 | 30 | 30 | 30 |
| Three point bending strength (N) | | 2100 | 2210 | 2370 | 2210 | 2050 | 1820 |
| Weight (g) | | 34.0 | 34.0 | 34.0 | 34.0 | 34.0 | 34.0 |

TABLE 14

| Tubular body No. | | 62 | 63 | 64 | 65 | 66 | 67 | 68 | 69 | 70 |
|---|---|---|---|---|---|---|---|---|---|---|
| Prepreg 1 | Type | PP22-1 | PP21 | PP22-2 | PP23-2 | PP24-2 | PP25-2 | PP27-2 | PP31-2 | PP34-2 |
| | Density (g/cm³) | 1.59 | 1.59 | 1.48 | 1.48 | 1.48 | 1.48 | 1.48 | 1.48 | 1.48 |
| | Reinforcing fiber tensile modulus (tf/mm²) | 30 | 30 | 40 | 40 | 40 | 40 | 40 | 40 | 40 |
| Prepreg 2 | Type | PP22-1 | PP21 | PP22-2 | PP23-2 | PP24-2 | PP25-2 | PP27-2 | PP31-2 | PP34-2 |
| Prepreg 3 | Type | PP22-1 | PP21 | PP22-2 | PP23-2 | PP24-2 | PP25-2 | PP27-2 | PP31-2 | PP34-2 |
| Prepreg 4 | Type | PP22-1 | PP21 | PP22-2 | PP23-2 | PP24-2 | PP25-2 | PP27-2 | PP31-2 | PP34-2 |
| Prepreg 5 | Type | PP22-1 | PP21 | PP22-2 | PP23-2 | PP24-2 | PP25-2 | PP27-2 | PP31-2 | PP34-2 |
| Prepreg 6 | Type | P805S-3 | P805S-3 | P805S-3 | P805S-3 | P805S-3 | P805S-3 | P805S-3 | P805S-3 | P805S-3 |

TABLE 14-continued

| Tubular body No. | | 62 | 63 | 64 | 65 | 66 | 67 | 68 | 69 | 70 |
|---|---|---|---|---|---|---|---|---|---|---|
| Prepreg 7 | Type | PP21 | PP22-1 | PP22-2 | PP23-2 | PP24-2 | PP25-2 | PP27-2 | PP31-2 | PP34-2 |
| Prepreg 8 | Type | PP21 | PP22-1 | PP22-2 | PP23-2 | PP24-2 | PP25-2 | PP27-2 | PP31-2 | PP34-2 |
| | Density (g/cm$^3$) | 1.59 | 1.59 | 1.48 | 1.48 | 1.48 | 1.48 | 1.48 | 1.48 | 1.48 |
| | Reinforcing fiber tensile modulus (tf/mm$^2$) | 30 | 30 | 40 | 40 | 40 | 40 | 40 | 40 | 40 |
| Three point bending strength (N) | | 2340 | 2260 | 1990 | 1790 | 1770 | 1870 | 1910 | 1970 | 1510 |
| Weight (g) | | 34.0 | 34.0 | 31.7 | 31.7 | 31.7 | 31.7 | 31.7 | 31.7 | 31.7 |

TABLE 15

| Tubular body No. | | 71 | 72 | 73 | 74 | 75 | 76 | 77 | 78 | 79 | 80 | 81 |
|---|---|---|---|---|---|---|---|---|---|---|---|---|
| Prepreg 1 | Type | PP22-2 | PP22-2 | PP22-2 | PP22-2 | PP22-2 | PP22-2 | PP22-2 | PP22-2 | PP22-2 | PP22-2 | PP21 |
| | Density (g/cm$^3$) | 1.48 | 1.48 | 1.48 | 1.48 | 1.48 | 1.48 | 1.48 | 1.48 | 1.48 | 1.48 | 1.59 |
| | Reinforcing fiber tensile modulus (tf/mm$^2$) | 40 | 40 | 40 | 40 | 40 | 40 | 40 | 40 | 40 | 40 | 30 |
| Prepreg 2 | Type | PP22-2 | PP22-2 | PP22-2 | PP22-2 | PP22-2 | PP22-2 | PP22-2 | PP22-2 | PP22-2 | PP22-2 | PP21 |
| Prepreg 3 | Type | PP22-2 | PP22-2 | PP22-2 | PP22-2 | PP22-2 | PP22-2 | PP22-2 | PP22-2 | PP22-2 | PP22-2 | PP21 |
| Prepreg 4 | Type | PP22-2 | PP22-2 | PP22-2 | PP22-2 | PP22-2 | PP22-2 | PP22-2 | PP22-2 | PP22-2 | PP22-2 | PP21 |
| Prepreg 5 | Type | PP22-2 | PP22-2 | PP22-2 | PP22-2 | PP22-2 | PP22-2 | PP22-2 | PP22-2 | PP22-2 | PP22-2 | PP21 |
| Prepreg 6 | Type | P805S-3 | P805S-3 | P805S-3 | P805S-3 | P805S-3 | P805S-3 | P805S-3 | P805S-3 | P805S-3 | P805S-3 | P805S-3 |
| Prepreg 7 | Type | PP21 | PP22-1 | PP23-1 | PP24-1 | PP25-1 | PP26 | PP27-1 | PP28 | PP31-1 | PP34-1 | PP22-2 |
| Prepreg 8 | Type | PP21 | PP22-1 | PP23-1 | PP24-1 | PP25-1 | PP26 | PP27-1 | PP28 | PP31-1 | PP34-1 | PP22-2 |
| | Density (g/cm$^3$) | 1.59 | 1.59 | 1.59 | 1.59 | 1.59 | 1.59 | 1.59 | 1.59 | 1.59 | 1.59 | 1.48 |
| | Reinforcing fiber tensile modulus (tf/mm$^2$) | 30 | 30 | 30 | 30 | 30 | 30 | 30 | 30 | 30 | 30 | 40 |
| Three point bending strength (N) | | 2140 | 2300 | 2030 | 2000 | 2180 | 2140 | 2230 | 1950 | 2270 | 1920 | 2120 |
| Weight (g) | | 32.4 | 32.4 | 32.4 | 32.4 | 32.4 | 32.4 | 32.4 | 32.4 | 32.4 | 32.4 | 33.3 |

TABLE 16

| Tubular body No. | | 82 | 83 | 84 | 85 | 86 | 87 | 88 |
|---|---|---|---|---|---|---|---|---|
| Prepreg 1 | Type | PP23-2 | PP23-2 | PP23-2 | PP23-2 | PP23-2 | PP23-2 | PP23-2 |
| | Density (g/cm$^3$) | 1.48 | 1.48 | 1.48 | 1.48 | 1.48 | 1.48 | 1.48 |
| | Reinforcing fiber tensile modulus (tf/mm$^2$) | 40 | 40 | 40 | 40 | 40 | 40 | 40 |
| Prepreg 2 | Type | PP23-2 | PP23-2 | PP23-2 | PP23-2 | PP23-2 | PP23-2 | PP23-2 |
| Prepreg 3 | Type | PP23-2 | PP23-2 | PP23-2 | PP23-2 | PP23-2 | PP23-2 | PP23-2 |
| Prepreg 4 | Type | PP23-2 | PP23-2 | PP23-2 | PP23-2 | PP23-2 | PP23-2 | PP23-2 |
| Prepreg 5 | Type | PP23-2 | PP23-2 | PP23-2 | PP23-2 | PP23-2 | PP23-2 | PP23-2 |
| Prepreg 6 | Type | P8058-3 | P805S-3 | P805S-3 | P805S-3 | P805S-3 | P805S-3 | P805S-3 |
| Prepreg 7 | Type | PP21 | PP22-1 | PP24-1 | PP25-1 | PP27-1 | PP31-1 | PP34-1 |
| Prepreg 8 | Type | PP21 | PP22-1 | PP24-1 | PP25-1 | PP27-1 | PP31-1 | PP34-1 |
| | Density (g/cm$^3$) | 1.59 | 1.59 | 1.59 | 1.59 | 1.59 | 1.59 | 1.59 |
| | Reinforcing fiber tensile modulus (tf/mm$^2$) | 30 | 30 | 30 | 30 | 30 | 30 | 30 |
| Three point bending strength (N) | | 2070 | 2250 | 1940 | 2150 | 2110 | 2190 | 2040 |
| Weight (g) | | 32.4 | 32.4 | 32.4 | 32.4 | 32.4 | 32.4 | 32.4 |

TABLE 17

| Tubular body No. | | 89 | 90 | 91 | 92 | 93 | 94 | 95 | 96 | 97 | 98 |
|---|---|---|---|---|---|---|---|---|---|---|---|
| Prepreg 1 | Type | PP24-2 | PP24-2 | PP25-2 | PP25-2 | PP27-2 | PP27-2 | PP31-2 | PP31-2 | PP34-2 | PP34-2 |
| | Density (g/cm$^3$) | 1.48 | 1.48 | 1.48 | 1.48 | 1.48 | 1.48 | 1.48 | 1.48 | 1.48 | 1.48 |
| | Reinforcing fiber tensile modulus (tf/mm$^2$) | 40 | 40 | 40 | 40 | 40 | 40 | 40 | 40 | 40 | 40 |
| Prepreg 2 | Type | PP24-2 | PP24-2 | PP25-2 | PP25-2 | PP27-2 | PP27-2 | PP31-2 | PP31-2 | PP34-2 | PP34-2 |
| Prepreg 3 | Type | PP24-2 | PP24-2 | PP25-2 | PP25-2 | PP27-2 | PP27-2 | PP31-2 | PP31-2 | PP34-2 | PP34-2 |
| Prepreg 4 | Type | PP24-2 | PP24-2 | PP25-2 | PP25-2 | PP27-2 | PP27-2 | PP31-2 | PP31-2 | PP34-2 | PP34-2 |
| Prepreg 5 | Type | PP24-2 | PP24-2 | PP25-2 | PP25-2 | PP27-2 | PP27-2 | PP31-2 | PP31-2 | PP34-2 | PP34-2 |
| Prepreg 6 | Type | P805S-3 | P805S-3 | P805S-3 | P805S-3 | P805S-3 | P805S-3 | P805S-3 | P805S-3 | P805S-3 | P805S-3 |
| Prepreg 7 | Type | PP21 | PP22-1 | PP21 | PP22-1 | PP21 | PP22-1 | PP21 | PP22-1 | PP21 | PP22-1 |
| Prepreg 8 | Type | PP21 | PP22-1 | PP21 | PP22-1 | PP21 | PP22-1 | PP21 | PP22-1 | PP21 | PP22-1 |
| | Density (g/cm$^3$) | 1.59 | 1.59 | 1.59 | 1.59 | 1.59 | 1.59 | 1.59 | 1.59 | 1.59 | 1.59 |
| | Reinforcing fiber tensile modulus (tf/mm$^2$) | 30 | 30 | 30 | 30 | 30 | 30 | 30 | 30 | 30 | 30 |
| Three point bending strength (N) | | 2040 | 2210 | 2110 | 2260 | 2130 | 2280 | 2160 | 2290 | 1800 | 1910 |
| Weight (g) | | 32.4 | 32.4 | 32.4 | 32.4 | 32.4 | 32.4 | 32.4 | 32.4 | 32.4 | 32.4 |

TABLE 18

| Tubular body No. | | 99 | 100 | 101 | 102 | 103 | 104 | 105 | 106 | 107 |
|---|---|---|---|---|---|---|---|---|---|---|
| Prepreg 1 | Type | PP22-5 | PP25-5 | PP27-5 | PP22-6 | PP25-6 | PP27-6 | PP22-7 | PP25-7 | PP27-7 |
| | Density (g/cm$^3$) | 1.48 | 1.48 | 1.48 | 1.50 | 1.50 | 1.50 | 1.46 | 1.46 | 1.46 |
| | Reinforcing fiber tensile modulus (tf/mm$^2$) | 50 | 50 | 50 | 60 | 60 | 60 | 80 | 80 | 80 |
| Prepreg 2 | Type | PP22-5 | PP25-5 | PP27-5 | PP22-6 | PP25-6 | PP27-6 | PP22-7 | PP25-7 | PP27-7 |
| Prepreg 3 | Type | PP22-5 | PP25-5 | PP27-5 | PP22-6 | PP25-6 | PP27-6 | PP22-7 | PP25-7 | PP27-7 |
| Prepreg 4 | Type | PP22-5 | PP25-5 | PP27-5 | PP22-6 | PP25-6 | PP27-6 | PP22-7 | PP25-7 | PP27-7 |
| Prepreg 5 | Type | PP22-5 | PP25-5 | PP27-5 | PP22-6 | PP25-6 | PP27-6 | PP22-7 | PP25-7 | PP27-7 |
| Prepreg 6 | Type | P805S-3 | P805S-3 | P805S-3 | P805S-3 | P805S-3 | P805S-3 | P805S-3 | P805S-3 | P805S-3 |
| Prepreg 7 | Type | PP22-1 | PP22-1 | PP22-1 | PP22-1 | PP22-1 | PP22-1 | PP22-1 | PP22-1 | PP22-1 |
| Prepreg 8 | Type | PP22-1 | PP22-1 | PP22-1 | PP22-1 | PP22-1 | PP22-1 | PP22-1 | PP22-1 | PP22-1 |
| | Density (g/cm$^3$) | 1.59 | 1.59 | 1.59 | 1.59 | 1.59 | 1.59 | 1.59 | 1.59 | 1.59 |
| | Reinforcing fiber tensile modulus (tf/mm$^2$) | 30 | 30 | 30 | 30 | 30 | 30 | 30 | 30 | 30 |
| Three point bending strength (N) | | 2210 | 2120 | 2170 | 2130 | 2060 | 2100 | 1980 | 1850 | 1930 |
| Weight (g) | | 32.5 | 32.5 | 32.5 | 32.8 | 32.8 | 32.8 | 32.1 | 32.1 | 32.1 |

| Tubular body No. | | 108 | 109 | 110 | 111 | 112 | 113 |
|---|---|---|---|---|---|---|---|
| Prepreg 1 | Type | PP23-2 | PP23-2 | PP23-2 | PP23-2 | PP23-2 | PP23-2 |
| | Density (g/cm$^3$) | 1.48 | 1.48 | 1.48 | 1.48 | 1.48 | 1.48 |
| | Reinforcing fiber tensile modulus (tf/mm$^2$) | 40 | 40 | 40 | 40 | 40 | 40 |
| Prepreg 2 | Type | PP23-2 | PP23-2 | PP23-2 | PP23-2 | PP23-2 | PP23-2 |
| Prepreg 3 | Type | PP23-2 | PP23-2 | PP23-2 | PP23-2 | PP23-2 | PP23-2 |
| Prepreg 4 | Type | PP23-2 | PP23-2 | PP23-2 | PP23-2 | PP23-2 | PP23-2 |
| Prepreg 5 | Type | PP23-2 | PP23-2 | PP23-2 | PP23-2 | PP23-2 | PP23-2 |
| Prepreg 6 | Type | P805S-3 | P805S-3 | P805S-3 | P805S-3 | P805S-3 | P805S-3 |
| Prepreg 7 | Type | PP22-3 | PP25-3 | PP27-3 | PP22-4 | PP25-4 | PP27-4 |
| Prepreg 8 | Type | PP22-3 | PP25-3 | PP27-3 | PP22-4 | PP25-4 | PP27-4 |
| | Density (g/cm$^3$) | 1.72 | 1.72 | 1.72 | 1.67 | 1.67 | 1.67 |
| | Reinforcing fiber tensile modulus (tf/mm$^2$) | 15 | 15 | 15 | 24 | 24 | 24 |

TABLE 18-continued

|  | | | | | | |
|---|---|---|---|---|---|---|
| Three point bending strength (N) | 2480 | 2370 | 2420 | 2360 | 2260 | 2330 |
| Weight (g) |  | 40.1 | 40.1 | 40.1 | 33.0 | 33.0 | 33.0 |

P-805S-3: Torayca prepreg P-805S-3 (carbon fiber: M30S (tensile modulus: 30 tf/mm$^2$ (294 GPa)), resin content: 40 mass %, density: 1.47 g/cm$^3$) manufactured by Toray Industries Inc.

From Table 8, it can be seen that tubular bodies made of the fiber-reinforced epoxy resin material, in which the epoxy resin composition comprises a novolac type epoxy resin and a phenoxy type epoxy resin, and the cured product of the epoxy resin composition has a swelling ratio in a range from 20 mass % to 44 mass % in methyl ethyl ketone, exhibit high three-point bending strength and tensile strength. For tubular bodies No. 8 to No. 10, the novolac type epoxy resin was not comprised in the epoxy resin composition, thus tubular bodies No. 8 to No. 10 exhibit inferior three-point bending strength and tensile strength. For tubular body No. 7, the cured product of the epoxy resin composition has an excessively high swelling ratio of 47.1 mass % in methyl ethyl ketone, thus tubular body No. 7 exhibit inferior three-point bending strength.

From Table 13, it can be seen that tubular bodies No. 48, 49, 52-54 and 56-59 in which an epoxy resin composition, that comprises a novolac type epoxy resin, a bisphenol A type epoxy resin and a bisphenol F type epoxy resin in a specified amount and a cured product thereof has a swelling ratio in a range from 20 mass % to 44 mass % in methyl ethyl ketone, was used, exhibit high three-point bending strength.

INDUSTRIAL APPLICABILITY

The tubular body made of the fiber-reinforced epoxy resin material according to the present invention can be suitably used for, for example, a golf club shaft, a fishing rod, a tennis racket, a badminton racket, and the like.

REFERENCE SIGNS LIST 1-8: prepreg, 10: chuck, 12: test piece composed of a cured product of an epoxy resin composition, 14: aluminum tag, 16: reinforcing fiber, 18: tubular body, 20: fulcrum, 22: midpoint between fulcrums

The invention claimed is:

1. A fiber-reinforced epoxy resin material comprising a cured product of an epoxy resin composition and a reinforcing fiber,
wherein the epoxy resin composition comprises an epoxy resin component including a novolac type epoxy resin, and a thermoplastic resin,
the novolac type epoxy resin content in the epoxy resin component ranges from 2 mass % to 10 mass %,
the thermoplastic resin is present in an amount ranging from 2 parts by mass to 12 parts by mass with respect to 100 parts by mass of the epoxy resin component, and
the cured product of the epoxy resin composition has a swelling ratio in a range from 20 mass % to 44 mass % in methyl ethyl ketone at 40° C. for 48 hours.

2. The fiber-reinforced epoxy resin material according to claim 1, wherein the epoxy resin composition comprises a polyvinyl formal as the thermoplastic resin.

3. The fiber-reinforced epoxy resin material according to claim 1, wherein the epoxy resin composition comprises dicyandiamide as a curing agent and a urea derivative as a curing accelerator.

4. The fiber-reinforced epoxy resin material according to claim 1, wherein the epoxy resin composition comprises dicyandiamide as a curing agent in an amount ranging from 13 g to 40 g with respect to 1 mole of an epoxy group of the epoxy resin component.

5. The fiber-reinforced epoxy resin material according to claim 1, wherein the epoxy resin component comprises the novolac type epoxy resin and a phenoxy type epoxy resin.

6. The fiber-reinforced epoxy resin material according to claim 5, wherein a mass ratio of the novolac type epoxy resin to the phenoxy type epoxy resin (novolac type epoxy resin/phenoxy type epoxy resin) in the epoxy resin component ranges from 0.4 to 7.

7. The fiber-reinforced epoxy resin material according to claim 5, wherein the epoxy resin component further comprises a bisphenol A type epoxy resin and a bisphenol F type epoxy resin.

8. The fiber-reinforced epoxy resin material according to claim 5, wherein a weight average molecular weight of the phenoxy type epoxy resin is 1,000 or more and 130,000 or less.

9. The fiber-reinforced epoxy resin material according to claim 5, wherein an epoxy equivalent (g/eq) of the phenoxy type epoxy resin is 4,000 or more and 20,000 or less.

10. The fiber-reinforced epoxy resin material according to claim 1, wherein a content of the reinforcing fiber in the fiber-reinforced epoxy resin material ranges from 65 mass % to 85 mass %.

11. The fiber-reinforced epoxy resin material according to claim 1, wherein the reinforcing fiber includes a carbon fiber.

12. The fiber-reinforced epoxy resin material according to claim 1, wherein the reinforcing fiber has a tensile modulus ranging from 10 tf/mm$^2$ to 70 tf/mm$^2$.

13. A prepreg used for preparing a fiber-reinforced epoxy resin material,
wherein the prepreg comprises an epoxy resin composition and a reinforcing fiber,
the epoxy resin composition comprises an epoxy resin component including a novolac type epoxy resin, and a thermoplastic resin,
the novolac type epoxy resin content in the epoxy resin component ranges from 2 mass % to 10 mass %,
the thermoplastic resin is present in an amount ranging from 2 parts by mass to 12 parts by mass with respect to 100 parts by mass of the epoxy resin component, and
a cured product of the epoxy resin composition has a swelling ratio in a range from 20 mass % to 44 mass % in methyl ethyl ketone at 40° C. for 48 hours.

14. The prepreg according to claim 13, wherein the epoxy resin component comprises the novolac type epoxy resin and a phenoxy type epoxy resin.

15. A tubular body made of a fiber-reinforced epoxy resin material, wherein the fiber-reinforced epoxy resin material comprises a cured product of an epoxy resin composition and a reinforcing fiber, the epoxy resin composition comprises an epoxy resin component including a novolac type epoxy resin, and a thermoplastic resin, the novolac type epoxy resin content in the epoxy resin component ranges from 2 mass % to 10 mass %, the thermoplastic resin is present in an amount ranging from 2 parts by mass to 12 parts by mass with respect to 100 parts by mass of the epoxy resin component, and the cured product of the epoxy resin composition has a swelling ratio in a range from 20 mass % to 44 mass % in methyl ethyl ketone at 40° C. for 48 hours.

16. A tubular body made of a fiber-reinforced epoxy resin material, wherein the tubular body is obtained by laminating multiple prepregs and curing a resin composition comprised in the prepregs;

the outermost prepreg locating on the outermost side is a prepreg comprising an epoxy resin composition and a reinforcing fiber, in which the epoxy resin composition comprises an epoxy resin component including a novolac type epoxy resin, and a thermoplastic resin, the novolac type epoxy resin content in the epoxy resin component ranges from 2 mass % to 10 mass %, the thermoplastic resin is present in an amount ranging from 2 parts by mass to 12 parts by mass with respect to 100 parts by mass of the epoxy resin component, and a cured product of the epoxy resin composition has a swelling ratio in a range from 20 mass % to 44 mass % in methyl ethyl ketone at 40° C. for 48 hours; and at least one of the prepregs locating on the inner side of the outermost prepreg has a smaller density than the outermost prepreg.

17. The tubular body made of the fiber-reinforced epoxy resin material according to claim 16, wherein the reinforcing fiber comprised in the prepreg which has a smaller density than the outermost prepreg has a larger tensile modulus than the reinforcing fiber comprised in the outermost prepreg.

18. The tubular body made of the fiber-reinforced epoxy resin material according to claim 16, wherein the reinforcing fiber comprised in the outermost prepreg has a tensile modulus ranging from 10 tf/mm$^2$ to 38 tf/mm$^2$, and the reinforcing fiber comprised in the prepreg which has a smaller density than the outermost prepreg has a tensile modulus ranging from 30 tf/mm$^2$ to 70 tf/mm$^2$.

19. A golf club shaft comprising a tubular body made of a fiber-reinforced epoxy resin material, wherein the fiber-reinforced epoxy resin material comprises a cured product of an epoxy resin composition and a reinforcing fiber, the epoxy resin composition comprises an epoxy resin component including a novolac type epoxy resin, and a thermoplastic resin, the novolac type epoxy resin content in the epoxy resin component ranges from 2 mass % to 10 mass %, the thermoplastic resin is present in an amount ranging from 2 parts by mass to 12 parts by mass with respect to 100 parts by mass of the epoxy resin component, and the cured product of the epoxy resin composition has a swelling ratio in a range from 20 mass % to 44 mass % in methyl ethyl ketone at 40° C. for 48 hours.

* * * * *